(12) United States Patent
Mikami

(10) Patent No.: US 11,503,173 B2
(45) Date of Patent: Nov. 15, 2022

(54) IMAGE READING APPARATUS

(71) Applicant: CANON KABUSHIKI KAISHA, Tokyo (JP)

(72) Inventor: Ryo Mikami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/386,466

(22) Filed: Jul. 27, 2021

(65) Prior Publication Data

US 2022/0046138 A1  Feb. 10, 2022

(30) Foreign Application Priority Data

Aug. 7, 2020 (JP) .............................. JP2020-134766

(51) Int. Cl.
*H04N 1/04* (2006.01)
*H04N 1/00* (2006.01)

(52) U.S. Cl.
CPC ..... *H04N 1/00745* (2013.01); *H04N 1/00748* (2013.01); *H04N 1/00771* (2013.01)

(58) Field of Classification Search
USPC ................................................ 358/497, 488
See application file for complete search history.

(56) References Cited

U.S. PATENT DOCUMENTS

| | | | | |
|---|---|---|---|---|
| 6,937,369 | B2 * | 8/2005 | Shih ....................... | H04N 1/047 358/506 |
| 7,420,717 | B2 * | 9/2008 | Park ..................... | H04N 1/0405 358/488 |
| 8,345,327 | B2 | 1/2013 | Mikami ........................ | 358/475 |
| 8,482,809 | B2 | 7/2013 | Mikami ........................ | 358/406 |
| 8,488,219 | B2 | 7/2013 | Mikami ........................ | 358/475 |
| 8,786,920 | B2 | 7/2014 | Mikami ........................ | 358/509 |
| 10,447,890 | B2 | 10/2019 | Mikami et al. ........ | H04N 1/409 |
| 2021/0409564 | A1 * | 12/2021 | Tomii ................. | H04N 1/00713 |

FOREIGN PATENT DOCUMENTS

JP   2009-164810   7/2009

* cited by examiner

*Primary Examiner* — Cheukfan Lee
(74) *Attorney, Agent, or Firm* — Venable LLP

(57) ABSTRACT

An image reading apparatus includes a reading unit having a plurality of light receiving elements arranged in a main scanning direction and configured to read an original placed on an original platen, a moving portion configured to move the reading unit in a sub-scanning direction, an edge extractor configured to extract original edges from image data of an original pressure plate and the original read by the reading unit, a determiner configured to determine, from the original edges, an angle of an original leading edge with respect to the main scanning direction and position information of one end of the original leading edge, a controller configured to terminate a movement of the reading unit when an original trailing edge end point is extracted from the original edges, and a rotation correction unit configured to correct a rotation of the image data based on the angle and the position information.

6 Claims, 15 Drawing Sheets

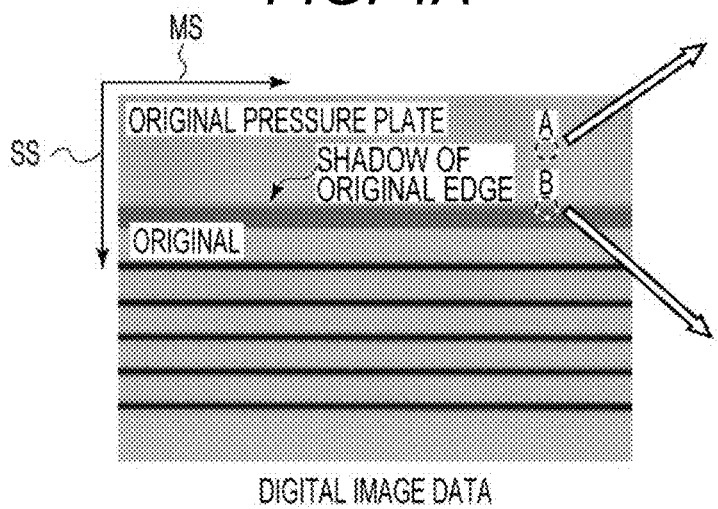
FIG. 4A
FIG. 4B
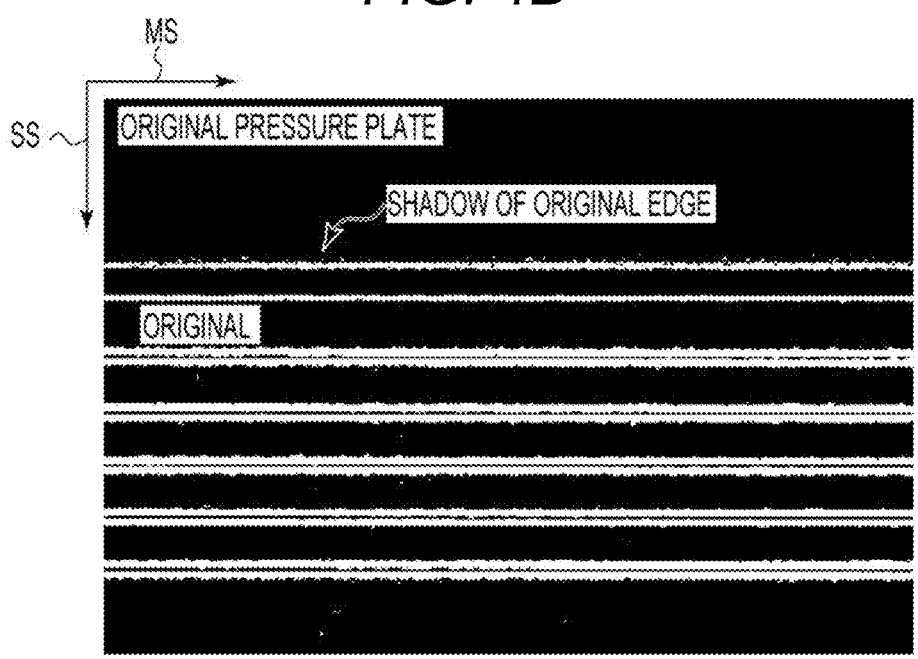
FIG. 4C
FIG. 4D

*FIG. 6A*
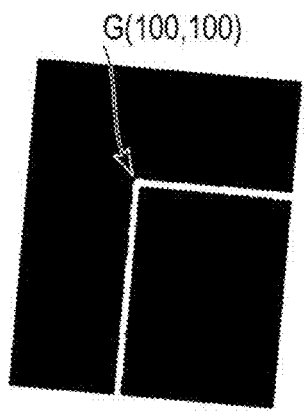
*FIG. 6B*
| | 99 | 100 | 101 |
|---|---|---|---|
| 99 | Ps(99,99)=0 | Ps(100,99)=0 | Ps(101,99)=0 |
| 100 | Ps(99,100)=0 | Ps(100,100)=1 | Ps(101,100)=0 |
| 101 | Ps(99,101)=1 | Ps(100,101)=1 | Ps(101,101)=1 |
*FIG. 6C*
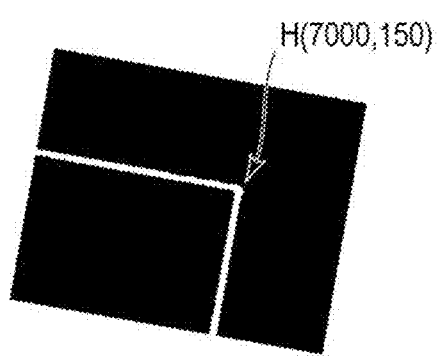
*FIG. 6D*
| | 6999 | 7000 | 7001 |
|---|---|---|---|
| 149 | Ps(6999,149)=1 | Ps(7000,149)=0 | Ps(7001,149)=0 |
| 150 | Ps(6999,150)=1 | Ps(7000,150)=1 | Ps(7001,150)=0 |
| 151 | Ps(6999,151)=1 | Ps(7000,151)=0 | Ps(7001,151)=0 |
*FIG. 6E*
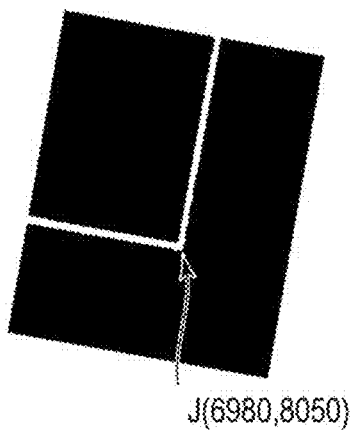
*FIG. 6F*
| | 6979 | 6980 | 6981 |
|---|---|---|---|
| 8049 | Ps(6979,8049)=1 | Ps(6980,8049)=1 | Ps(6981,8049)=1 |
| 8050 | Ps(6979,8050)=0 | Ps(6980,8050)=1 | Ps(6981,8050)=0 |
| 8051 | Ps(6979,8051)=0 | Ps(6980,8051)=0 | Ps(6981,8051)=0 |

| LINE NUMBER | BRIGHTNESS VALUE OF READING POSITIONS D-E | BRIGHTNESS VALUE OF READING POSITIONS L-M | BRIGHTNESS VALUE OF READING POSITIONS F-K |
|---|---|---|---|
| 1 | 249 | 249 | 255 |
| 2 | 249 | 249 | 255 |
| 3 | 250 | 250 | 255 |
| 4 | 252 | 252 | 255 |
| 5 | 252 | 252 | 255 |
| 6 | 253 | 253 | 255 |
| 7 | 253 | 253 | 255 |
| 8 | 253 | 10 | 255 |
| 9 | 253 | 10 | 255 |
| 10 | 254 | 10 | 255 |
| 11 | 254 | 254 | 255 |
| 12 | 254 | 254 | 255 |
| 13 | 254 | 254 | 255 |
| 14 | 254 | 254 | 255 |
| 15 | 255 | 255 | 255 |
| 16 | 255 | 255 | 255 |
| VARIANCE VALUE | 1.9 | 97.8 | 0.0 |

IMAGE READING APPARATUS

BACKGROUND OF THE INVENTION

Field of the Invention

The present invention relates to an image reading apparatus configured to read an image of an original placed on an original platen.

Description of the Related Art

There is known an image reading apparatus which reads an image of an original by irradiating the original with light emitted from an LED and reading the reflected light by an image pickup portion provided with an image sensor. In such an image reading apparatus, it is known to read the image of the original placed on an original platen glass while moving the image pickup portion along the original in a first direction (sub-scanning direction) under the original platen glass. The image sensor has a plurality of light receiving elements arranged in a second direction (main scanning direction) orthogonal to the first direction.

In recent years, there has been an increasing demand for an image reading apparatus having a multi-crop function. In such an image reading apparatus, it is required to read an original placed roughly without being positioned on the original platen glass. In Japanese Patent Application Laid-Open No. 2009-164810, a pre-scan operation, which is a scanning operation for determining the inclination of an original in the main scanning direction, is executed before reading an image of the original placed on the original platen glass. After the completion of the pre-scan, an actual scan as a scanning operation for reading the image of the original is performed.

In the configuration disclosed in the Japanese Patent Application Laid-Open No. 2009-164810, due to the execution of the pre-scan in addition to the actual scan, the time required from the start of the reading operation of the image of the original to the end thereof is increased as compared with the case where the pre-scan is not executed. For this reason, there has been a need for a configuration in which an image of an original placed on the original platen glass without being positioned can be read in a shorter time.

SUMMARY OF THE INVENTION

According to an embodiment of the present invention, an image reading apparatus comprises:

an original platen on which an original is placed;

an original pressure plate configured to press the original placed on the original platen;

a reading unit having a plurality of light receiving elements arranged in a main scanning direction and configured to read the original placed on the original platen;

a moving portion configured to move the reading unit in a sub-scanning direction orthogonal to the main scanning direction;

an edge extractor configured to extract original edges from image data of the original pressure plate and the original read by the reading unit being moved in the sub-scanning direction by the moving portion;

a storage portion configured to store the image data read by the reading unit;

a determiner configured to determine, from the original edges extracted by the edge extractor, an angle of an original leading edge on an upstream side in the sub-scanning direction with respect to the main scanning direction and position information of one end of the original leading edge;

a controller configured to terminate a movement of the reading unit in a case in which an original trailing edge end point on a downstream side in the sub-scanning direction is extracted from the original edges extracted by the edge extractor; and a rotation correction unit configured to correct a rotation of the image data stored in the storage portion based on the angle and the position information determined by the determiner, and reads out corrected image data from the storage portion.

Further features of the present invention will become apparent from the following description of exemplary embodiments with reference to the attached drawings.

BRIEF DESCRIPTION OF THE DRAWINGS

FIG. 4A, FIG. 4B, FIG. 4C, and FIG. 4D are explanatory views of showing an edge extraction processing by an edge extractor.

FIG. 6A, FIG. 6B, FIG. 6C, FIG. 6D, FIG. 6E, and FIG. 6F are explanatory views of extracting an original leading edge and an original trailing edge end point.

DESCRIPTION OF THE EMBODIMENTS

Hereinafter, the embodiments of the present invention will be described with reference to the accompanying drawings.

First Embodiment (Image Forming Apparatus)

Figure 1:
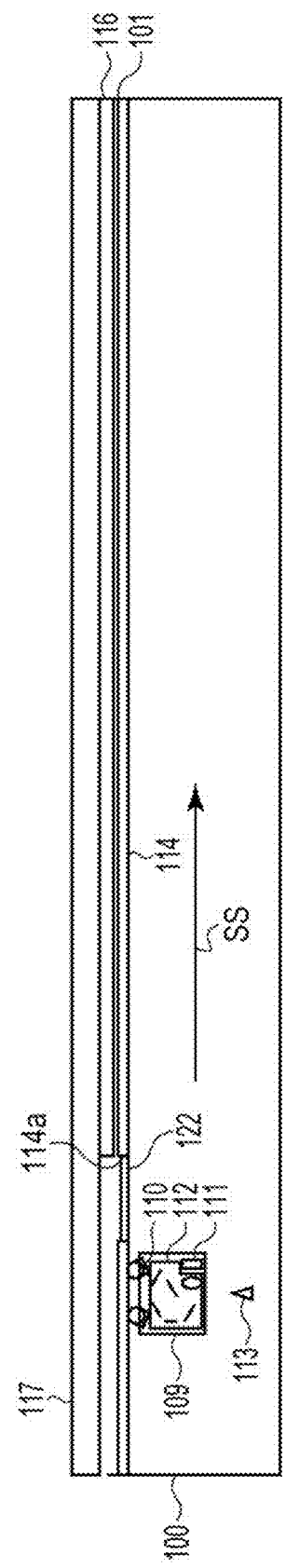
FIG. 1 is a cross-sectional view of an image reading apparatus.

FIG. 1 is a cross-sectional view of an image reading apparatus 100. The image reading apparatus (also called an original reading apparatus) 100 includes an original platen glass 114 serving as an original platen on which an original 101 is placed. Adjacent to one end 114a of the original platen glass 114, a white reference plate 122, which is a reference member to be read for acquiring shading data, is disposed. The image reading apparatus 100 includes a reading unit 109 configured to read an image of the original 101 placed on the original platen glass 114 from under the original platen glass 114.

The reading unit 109 is moved in a sub-scanning direction SS by a motor 201 (FIG. 2) serving as a moving portion. The reading unit 109 includes a light emitting diode (hereinafter referred to as LED) 110, an image sensor 111, an optical component group 112, and an A/D converter (not shown). The LED 110 illuminates the original 101 placed on the original platen glass 114. The optical component group 112 reflects light reflected from the original 101, condenses the light, and forms an image on the image sensor 111. The image sensor 111 reads the original 101 line-sequentially in a main scanning direction MS. The main scanning direction MS is orthogonal to the sub-scanning direction SS. An A/D converter (not shown) converts analog image data output from the image sensor 111 into digital image data, and outputs the digital image data to a controller 200 (FIG. 2).

A home position sensor 113 configured to obtain position information of the reading unit 109 is provided inside the image reading apparatus 100. After the reading unit 109 passes the home position sensor 113, the controller 200 (FIG. 2) starts receiving image data from the reading unit 109 at a predetermined timing t2 (FIG. 3) at which the reading unit 109 reaches the one end 114a of the original platen glass 114. The image reading apparatus 100 rotatably supports the original pressing member 117 with respect to the image reading apparatus 100. The original pressing member 117 includes a white original pressure plate 116 configured to press the original 101 placed on the original platen glass 114. The original pressure plate 116 is a white flat member that rotates integrally with the original pressing member 117. When the original pressing member 117 is closed while the original 101 is placed on the original platen glass 114, the original pressure plate 116 presses the original 101 against the original platen glass 114. The original pressing member 117 may be an automatic original (document) feeder (ADF) configured to convey originals.

(Control System)

Figure 2:
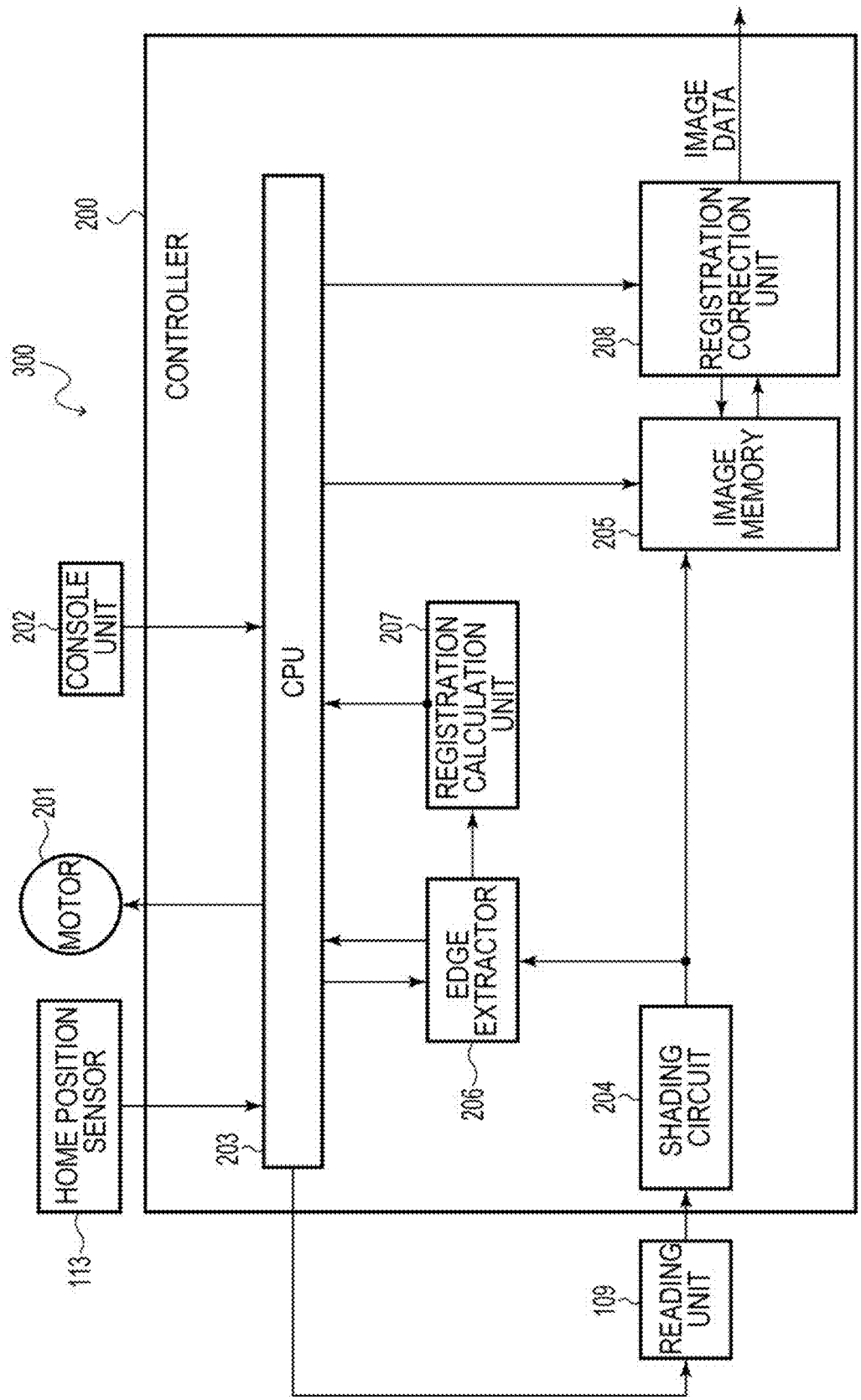
FIG. 2 is a block diagram of a control system of a first embodiment.

With reference to FIG. 2, a control system 300 of the image reading apparatus 100 will be described. FIG. 2 is a block diagram of the control system 300 of the first embodiment. The control system 300 includes the controller 200, the motor (drive portion) 201, a console unit 202, the reading unit 109, and the home position sensor 113. The controller 200 is connected to the reading unit 109, the home position sensor 113, the motor 201, and the console unit 202. The controller 200 includes a CPU 203, a shading circuit 204, an image memory (storage unit) 205, an edge extractor 206, a registration calculation unit 207, and a registration correction unit 208. The CPU 203 controls the image reading apparatus 100 including the reading unit 109 and the motor 201, the edge extractor 206 as an image processing portion, the registration calculation unit 207, the registration correction unit 208, and the image memory 205.

A user can input instruction to start reading from a console unit 202. Upon receiving the instruction to start reading from the console unit 202, the CPU 203 starts an image reading operation by the image reading apparatus 100. The CPU 203 drives the motor 201 to move the reading unit 109 in the sub-scanning direction SS. When the reading unit 109 receives drive instruction from the CPU 203, the LED 110 is turned on to illuminate the original placed on the original platen glass 114 and the white original pressure plate 116. The image sensor 111 converts light reflected from the original and the white original pressure plate 116 into analog image data. The A/D converter (not shown) converts the analog image data into digital image data and transmits the digital image data to the controller 200. The digital image data shows a higher numerical value as the intensity of the reflected light is larger. Hereinafter, the numerical value of the digital image data is referred to as a brightness value. The image sensor 111 has a plurality of light receiving elements (hereinafter referred to as pixels) configured to receive light of three colors: R (red), G (green), and B (blue), respectively. Each of the plurality of light receiving elements of R (red), G (green) and B (blue) is arranged in the main scanning direction. The number of each of the plurality of light receiving elements of R (red), G (green) and B (blue) is 7488.

The digital image data outputted from the reading unit 109 is transmitted to the shading circuit 204 in the controller 200. The shading circuit 204 applies addition/subtraction or multiplication/division to the inputted digital image data to correct density unevenness caused by the unevenness of the light quantity of the LED 110 or the unevenness of the sensitivity of each pixel of the image sensor 111 (hereinafter referred to as shading correction). The image data subjected to shading correction are stored in the image memory 205 as a storage portion at a predetermined timing.

Figure 3:
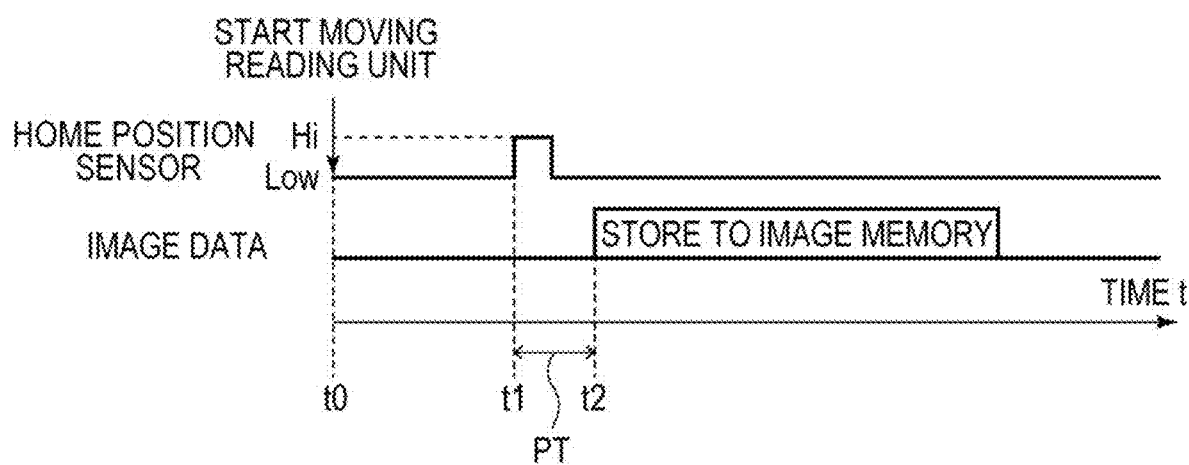
FIG. 3 is a view showing the timing of storing image data into an image memory.

FIG. 3 is a view showing the timing of storing the image data into the image memory 205. A time t1 elapses from when the reading unit 109 starts moving to when the reading unit 109 reaches the position of the home position sensor 113. When the reading unit 109 reaches the home position sensor 113, the home position sensor 113 is turned on (transition from Low to Hi in FIG. 3). The ON signal of the home position sensor 113 is input to the CPU 203. The CPU 203 starts to store image data in the image memory 205 at a predetermined timing t2 at which the reading unit 109 reaches the one end 114a of the original platen glass 114 after a predetermined time PT elapses from the time t1 at which the home position sensor 113 is turned on.

(Edge Extraction)

First, an edge extraction method will be described. The digital image data outputted from the shading circuit 204 is inputted to the image memory 205 and also inputted to the edge extractor 206. In the first embodiment, the timing at which the input of the image data to the edge extractor 206 is started is the same as the predetermined timing t2 at which the storage of the image data to the image memory 205 shown in FIG. 3 is started. The edge extractor 206 extracts an original edge from the input digital image data. In the first embodiment, among the input RGB digital image data, the G (green) image data is used to extract an original edge.

FIG. 4A, FIG. 4B, FIG. 4C, and FIG. 4D are explanatory views of showing an edge extraction processing by the edge extractor 206. FIG. 4A shows image data of 8 bits (brightness value: 0 to 255). As described above, the input of the image data to the edge extractor 206 is started from the predetermined timing t2 at which the reading unit 109 reaches the one end 114a of the original platen glass 114. Therefore, in the sub-scanning direction SS, the image data of the original pressure plate 116 facing the reading unit 109 upstream (upward in FIG. 4A) of the shadow of the edge of the original is also input to the edge extractor 206. The edge extractor 206 performs binarization processing on the image data shown in FIG. 4A using an area of 9 pixels (=3×3 pixels) of 3 pixels in the main scanning direction MS and 3 pixels (3 lines) in the sub-scanning direction SS as one block. The line represents the timing at which the reading unit 109 moving in the sub-scanning direction SS reads.

FIG. 4B is a view showing brightness values of nine pixels at a point A in FIG. 4A. FIG. 4C is a view showing brightness values of nine pixels at a point B in FIG. 4A. In FIGS. 4B and 4C, the pixel number (pixel position) in the main scanning direction MS is denoted by "n" ($1 \leq n \leq 7486$), and the line number (pixel position) in the sub-scanning direction SS is denoted by "m" ($1 \leq m$). Let px (x=0 to 8) be the brightness value of each pixel. The edge extractor 206 calculates a difference between a maximum value pmax and a minimum value pmin in brightness values of 9 pixels. As shown in FIG. 4B, the difference between the maximum value pmax and the minimum value pmin is small because all of the 9 pixels are white pixels when all of the 9 pixels are on the white original pressure plate 116 as in the point A of FIG. 4A. On the other hand, as shown in FIG. 4C, when the 9 pixels are at the boundary between the white original pressure plate 116 and the shadow (gray) on the edge of the original, the difference between the maximum value pmax and the minimum value pmin is large because the white pixels and the gray pixels are mixed in the 9 pixels.

Therefore, when the difference between the maximum value pmax and the minimum value pmin is equal to or greater than a first threshold value pth, the pixel p4 at the center coordinate (n, m) of the 3×3 pixels is defined as an edge pixel on the original edge. Specifically, when the following expression 1 is satisfied, the edge extractor 206 determines that the pixel p4 at the center coordinate (n, m) of the 3×3 pixels is an edge pixel.

$$p\text{max}-p\text{min} \geq p\text{th} \qquad \text{Expression 1}$$

The edge extractor 206 determines, for each line number "m" (except m=0) in the sub-scanning direction SS, whether a pixel having the pixel number "n" (except n=0 and 7487) is an edge pixel with respect to pixel data input to the edge extractor 206, and generates binarized data. FIG. 4D is a view showing an image based on the binarized data generated by the edge extractor 206 using a first threshold value pth=14. In FIG. 4D, the pixel shown in white is an edge pixel satisfying the above expression 1. In this way, the shadow of the original edge in FIG. 4A is determined to be the edge of the original on the upstream side in the sub-scanning direction SS in which the reading unit 109 is moved. According to the edge extraction method described above, original edges in either the main scanning direction MS or the sub-scanning direction SS can be extracted.

(Extractions of Leading Edge and Trailing Edge End Point)

Hereinafter, extractions of an edge (original leading edge) of an original on the upstream side and an end point (downstream end point of the original) of an edge (original trailing edge) of the original on the downstream side in the sub-scanning direction SS in which the reading unit 109 is moved will be described. The binarized data output from the edge extractor 206 is input to the CPU 203. The CPU 203 determines the value of the original edge flag Ps (n, m) for each pixel. Here, n=1 to 7486 (except for n=0 and n=7487) and m=1 to 10199 (except for m=0 and m=10200). "n" is a pixel number in the main scanning direction MS. "m" is a line number in the sub-scanning direction SS. The maximum value of the line number "m" is predetermined by the size of the main body of the image reading apparatus 100. In the embodiment, the maximum value of the line number "m" is 10200. The line number "0" corresponds to a reading start position by the reading unit 109. The line number 10200 corresponds to a reading end position in a case where the reading unit 109 reads the maximum readable area.

A value of the original edge flag Ps (n, m) for a pixel determined to be the original edge by the above-described edge extraction method is "1". A value of the original edge flag Ps (n, m) for a pixel determined not to be the original edge is "0". In the following description, it is said that the original edge flag Ps (n, m) is put up when the original edge flag Ps (n, m) takes the value of "1".

For each line number "m" in the sub-scanning direction SS, the edge extraction method determines whether or not the original edge flag Ps (n, m) is put up at each pixel number "n". In the same pixel number "n" (n=1 to 7486 except for n=0 and n=7487), the pixel at which the original edge flag Ps (n, m) is first put up is determined to be the original leading edge.

The original trailing edge end point is determined based on the continuity of the original edge in the edge extraction result after the original front end edge is extracted. Specifically, it is determined that the pixel of interest, of which an original edge flag Ps (n, m)=1 is not continuous in the range of the ±1 pixel (3×3 pixels) in the main and sub-scanning directions with respect to the pixel of interest in the edge extraction, is the original trailing edge end point.

Figure 5:
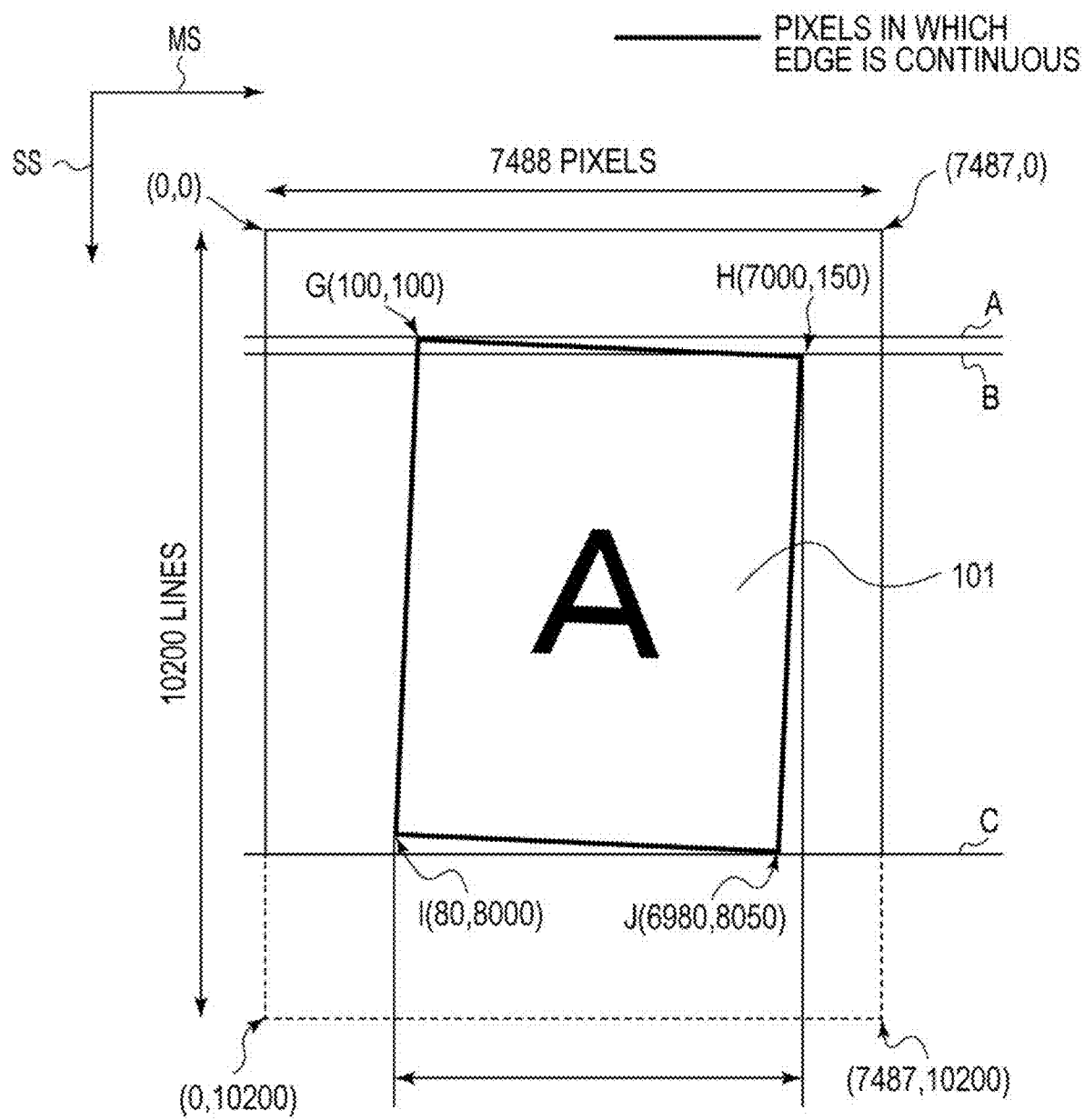
FIG. 5 is a view showing a relationship between an arrangement of an original and reading positions in a sub-scanning direction.

FIG. 5 is a view showing a relationship between an arrangement of the original 101 and reading positions (line number "m") in the sub-scanning direction SS. The four vertexes of the original 101 placed on the original platen glass 114 are G (100,100), H (7000,150), I (80, 8000), and J (6980, 8050). At the reading position A (line number m=100) in the sub-scanning direction SS, the vertex G (100,100) is read. At the reading position B (line number m=150), the vertex H (7000,150) is read. At the reading position C (line number m=8050), the vertex J (6980, 8050) is read.

FIG. 6A, FIG. 6B, FIG. 6C, FIG. 6D, FIG. 6E, and FIG. 6F are explanatory views of extracting the original leading edge and the original trailing edge end point. FIG. 6A is a view showing a binarized image around the vertex G (100, 100) of the original 101. FIG. 6B is a view showing the values of the original edge flags Ps (n, m) of 3×3 pixels centered on the vertex G (100,100) at the reading position A (line number m=100). In FIG. 6B, the values of the original edge flags Ps (99, 99), Ps (100, 99), Ps (101, 99), Ps (99,100) and Ps (101,100) of the pixels indicated by the white background are "0". In FIG. 6B, the values of the original edge flags Ps (100,100), Ps (99,101), Ps (100,101) and Ps (101,101) of the pixels indicated by the gray background are "1". The vertex G (100,100), which is a pixel of which an original edge flag Ps (n, m) is first put up at the same pixel number n=100, is determined to be an original leading edge. Since the pixels (edge pixels) of which the original edge flags Ps (n, m) are put up continue from the line number m=100 to the line number m=101, the movement of the reading unit 109 in the sub-scanning direction SS is continued.

FIG. 6C is a view showing a binarized image around the vertex H (7000,150) of the original 101. FIG. 6D is a view showing the values of the original edge flags Ps (n, m) of 3×3 pixels centered on the vertex H (7000,150) at the reading position B (line number m=150). In FIG. 6D, the values of the original edge flags Ps (7000,149), Ps (7001, 149), Ps (7001,150), Ps (7000,151) and Ps (7001,151) of the pixels indicated by the white background are "0". In FIG. 6D, the values of the original edge flags Ps (6999,149), Ps (6999,150), Ps (7000,150) and Ps (6999,151) indicated by the gray background are "1". The vertex H (7000,150), which is a pixel on which an original edge flag Ps (n, m) is first put up at the same pixel number n=7000, is also determined to be an original leading edge. Since the pixels (edge pixels) of which the original edge flags Ps (n, m) are put up continue from the line number m=150 to the line number m=151, the movement of the reading unit 109 in the sub-scanning direction SS is continued.

FIGS. 6B and 6D show, as an example, the values of the original edge flags Ps (n, m) of 3×3 pixels centered on the vertex G (100,100) and the vertex H (7000,150). The edge extraction is performed at each pixel number "n" for each line number "m". A pixel of which an original edge flag Ps (n, m) is first put up in the same pixel number "n" is determined to be the original leading edge. The information on the original leading edge is used in a registration calculation, which will be described later.

FIG. 6E is a view showing a binarized image around a vertex J (6980, 8050) which is an original trailing edge end point of the original 101. FIG. 6F is a view showing the values of the original edge flags Ps (n, m) of 3×3 pixels centered on the vertex J (6980, 8050) at the reading position C (line number m=8050). In FIG. 6F, the values of the original edge flags Ps (6979, 8050), Ps (6981, 8050), Ps (6979, 8051), Ps (6980, 8051) and Ps (6981, 8051) of the pixels indicated by the white background are "0". In FIG. 6F, the values of the original edge flags Ps (6979, 8049), Ps (6980, 8049), Ps (6981, 8049) and Ps (6980, 8050) of the pixels indicated by the gray background are "1". The values of the original edge flags Ps (6979, 8051), Ps (6980, 8051) and Ps (6981, 8051) at the line number m=8051 following the line number m=8050 are "0". Therefore, pixels (edge pixels) of which original edge flags Ps (n, m) are put up do not continue from the line number m=8050 to the line number m=8051. Therefore, it is determined that the vertex J (6980, 8050) at which the original edge flag Ps (6980, 8050) is put up at the line number m=8050 is the original trailing edge end point. The movement of the reading unit 109 in the sub-scanning direction SS is ended at line number m=8051.

(Registration Calculation)

The binarized data outputted from the edge extractor 206 is also inputted to the registration calculation unit 207 as an original attitude calculation means. The registration calculation unit 207 stores binarized data up to the original trailing edge end point extracted in the edge extraction processing described above. The registration calculation unit 207 calculates registration information of the original 101 from binarized data.

Figure 7:
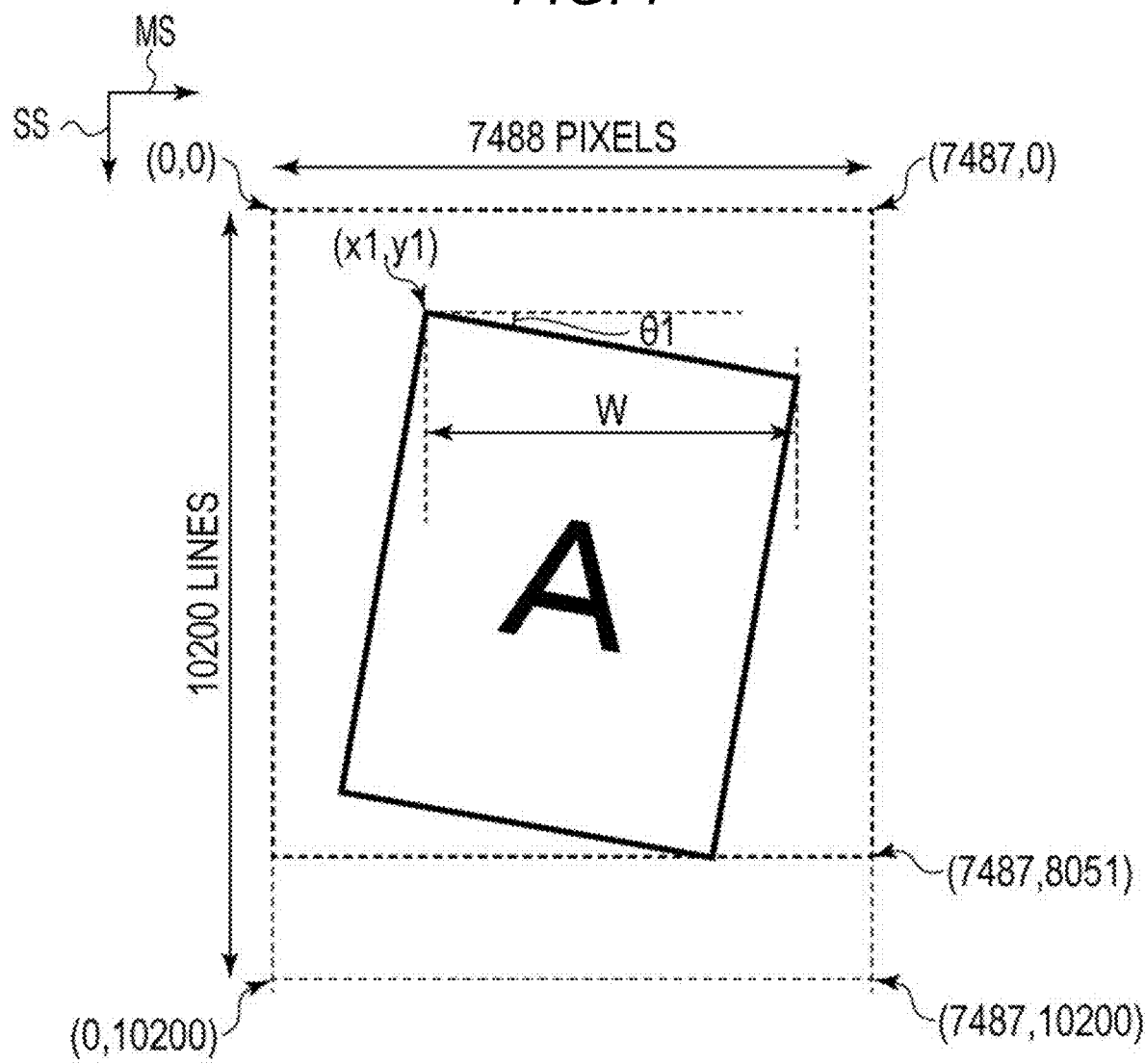
FIG. 7 is an explanatory view of registration calculation by a registration calculation unit.

FIG. 7 is an explanatory view of registration calculation by the registration calculation unit 207. FIG. 7 is a view showing the binarized data input from the edge extractor 206 to the registration calculation unit 207. With reference to FIG. 7, the registration information determined by the registration calculation unit 207 as a determiner will be described. As described above, the image data read by the reading unit 109 is input to the edge extractor 206 from the predetermined timing t2 until the original trailing edge end point is determined. To the registration calculation unit 207, the binarized data in the range indicated by the dotted line in FIG. 7 is input from the edge extractor 206. Specifically, by the edge extraction processing described above, the binarized data of the image in the range from the coordinates (0, 0) to the coordinates (7487, 8051) is input to the registration calculation unit 207. The registration calculation unit 207 calculates registration information of the original 101 from the binarized data. The registration information includes an angle θ1 of the original leading edge, a direction (=sign) of the angle, and coordinates (x1, y1) of the original leading edge end point (left end in FIG. 7). The registration calculation unit 207 transmits the calculated registration information to the CPU 203. With respect to the sign in the direction of the angle θ1 (inclination) of the original leading edge, the upward right direction (counterclockwise direction) is defined as the + direction, and the downward right direction (clockwise direction) is defined as the – direction.

(Registration Correction)

The CPU 203 transmits the angle θ1 of the original leading edge, the direction of the angle, and the coordinates (x1, y1) as position information of the original leading edge end point determined by the registration calculation unit 207 to the registration correction unit 208. The registration correction unit 208 reads out the image data stored in the image memory 205 while performing registration correction on the image data based on the angle θ1 of the original leading edge, the direction of the angle, and the coordinates (x1, y1) of the original leading edge end point. Specifically, the registration correction is performed, for example, by reading out the image data from the image memory 205 along the edge side of the original image from the upper-left coordinate (x1, y1) (along the direction of the original leading edge angle (the angle θ1)). For example, a general affine transformation may be used for registration correction.

Figure 8A:
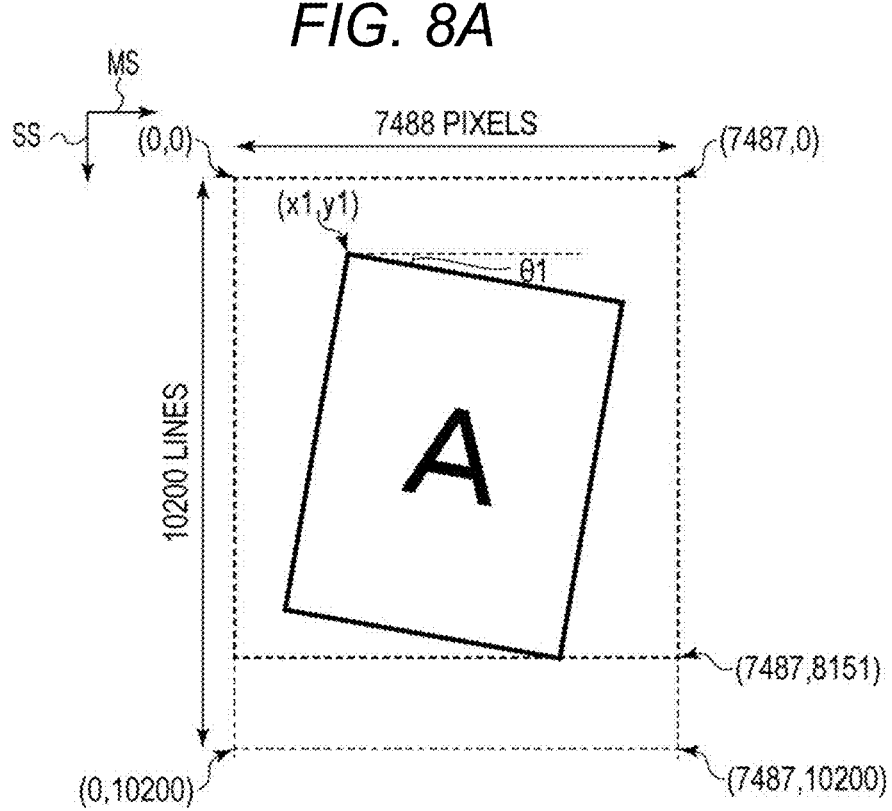
FIG. 8A and FIG. 8B are explanatory views of registration correction by a registration correction unit.
Figure 8B:
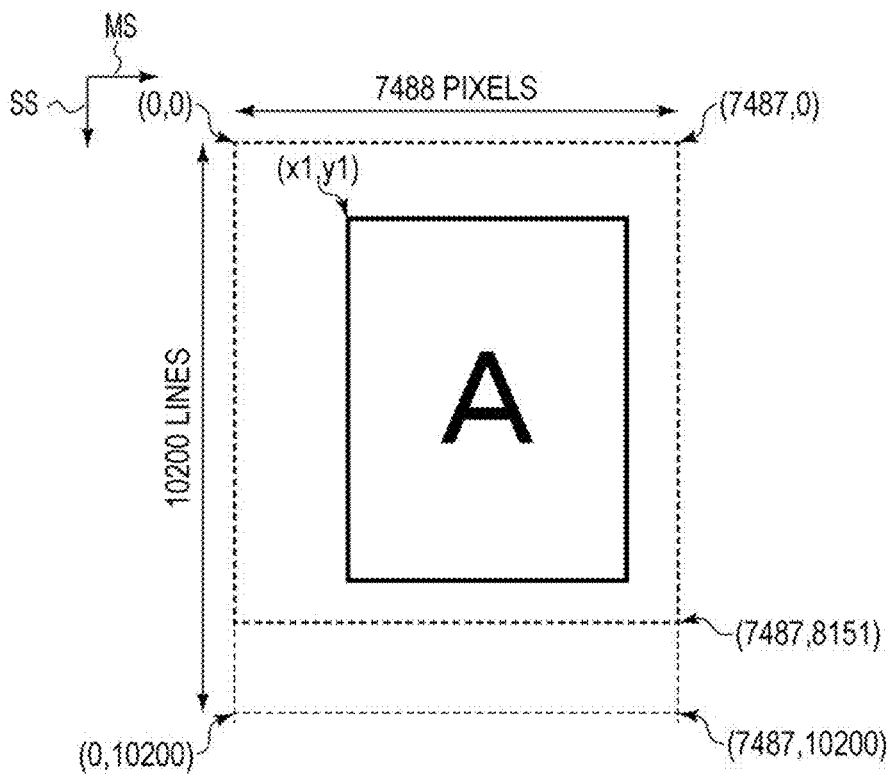

FIGS. 8A and 8B are explanatory views of the registration correction (rotation correction) by the registration correction unit (rotation correction unit) 208. FIG. 8A is a view showing image data stored in the image memory 205 before the registration correction. FIG. 8B is a view showing image data obtained by performing the registration correction on the image data of FIG. 8A.

(Control Flowchart)

Figure 9:
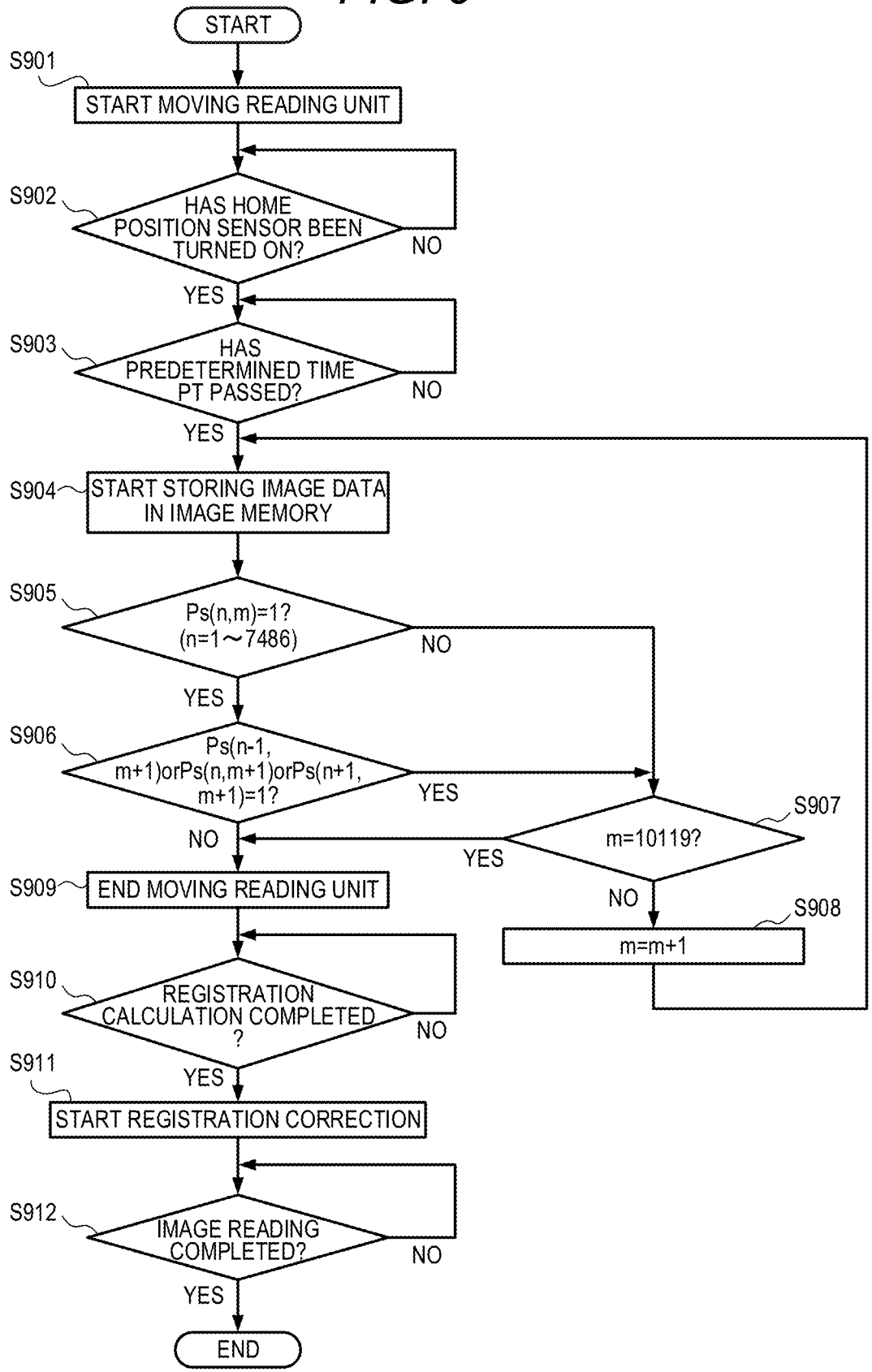
FIG. 9 is a flowchart showing an image reading operation of the first embodiment.

FIG. 9 is a flowchart showing an image reading operation of the first embodiment. The CPU 203 executes the image reading operation in accordance with a program stored in an internal memory (not shown). When receiving the instruction to start reading from the console unit 202, the CPU 203 moves the reading unit 109 from the standby position toward the original platen glass 114 in the sub-scanning direction SS in S901.

In S902, the CPU 203 determines whether or not the home position sensor 113 is turned on. In a case in which the home position sensor 113 is not turned on (NO in S902), the CPU 203 waits until the reading unit 109 reaches the home position sensor 113. When the reading unit 109 reaches the home position sensor 113, the home position sensor 113 is turned on. In a case in which the home position sensor 113 is turned on (YES in S902), the CPU 203 advances the process to S903.

In S903, the CPU 203 determines whether or not a predetermined time PT has elapsed from the time t1 (FIG. 3) at which the home position sensor 113 is turned on. When the predetermined time PT elapses, the predetermined timing t2 shown in FIG. 3 is reached. In a case in which the predetermined time PT has not elapsed (NO in S903), the CPU 203 waits until the predetermined time PT has elapsed and the predetermined timing t2 is reached. In a case in which the predetermined time PT has elapsed (YES in S903), the CPU 203 advances the process to S904.

In S904, the CPU 203 starts to store the image data output from the reading unit 109 into the image memory 205 via the shading circuit 204. At this time, the image data is simultaneously transmitted to the edge extractor 206 via the shading circuit 204. The edge extractor 206 starts the edge extraction processing and transmits the binarized data obtained by the edge extraction processing to the registration calculation unit 207. The registration calculation unit 207 starts the registration calculation.

In S905, the CPU 203 extracts an original edge by the edge extractor 206. The CPU 203 determines whether or not the original edge flag Ps (n, m) of the pixel of the pixel number "n" (n=1 to 7486 excluding n=0 and 7487) at the line number "m" (1≤m) is "1". In a case in which the original edge flags Ps (n, m) of the pixels of all the pixel numbers "n" (n=1 to 7486 excluding n=0 and 7487) in the line number "m" is "0" (NO in S905), the CPU 203 advances the process to step S907. In this case, the pixels having the line number "m" and the pixel numbers "n" (n=1 to 7486 excluding n=0 and 7487) do not have an edge pixel representing an original edge. In a case in which there is a pixel with the line number "m" and the original edge flag Ps (n, m) (n=1 to 7486) is "1" (YES in S905), the CPU 203 advances the process to S906. The CPU 203 determines the pixel of which the original edge flag Ps (n, m) is "1" to be an edge pixel representing the original edge.

In S906, the CPU 203 determines the continuity of the original edges. In the case in which there is the pixel of which the original edge flag Ps (n, m) is "1" in the line number "m", the CPU 203 determines whether the original edge flag Ps (n−1, m+1), Ps (n, m+1), or Ps (n+1, m+1) is "1" in the next line number m+1. In a case in which any one of the original edge flags Ps (n−1, m+1), Ps (n, m+1) and Ps (n+1, m+1) is "1" (YES in S906), the CPU 203 advances the process to S907. In this case, since it is determined that the original edge is continuous, the movement of the reading unit 109 in the sub-scanning direction SS is continued.

In S907, the CPU 203 determines whether the line number "m" in the sub-scanning direction SS has reached "10119". In a case in which the line number "m" has reached "10119" (YES in S907), the CPU 203 advances the process to S909. On the other hand, in a case in which the line number "m" has not reached "10119" (NO in S907), the CPU 203 advances the process to S908. In S908, the CPU 203 increments the line number "m" (m=m+1). The CPU 203 returns the process to S904.

In S906, in a case in which all of the original edge flags Ps (n−1, m+1), Ps (n, m+1), and Ps (n+1, m+1) are "0" (NO in S906), the CPU 203 advances the process to S909. In the case in which all of the original edge flags Ps (n−1, m+1), Ps (n, m+1), and Ps (n+1, m+1) are "0" at the next line number m+1, the pixel of which the original edge flag Ps (n, m) is put up at the line number "m" is determined to be the original trailing edge end point. In S909, the CPU 203 stops the motor 201 to end the movement of the reading unit 109 in the sub-scanning direction SS. In S907, in the case in which the line number "m" reaches "10119" (YES in S907), the CPU 203 advances the process to S909 and stops the motor 201 to end the movement of the reading unit 109.

In S910, the CPU 203 determines whether or not the registration calculation by the registration calculation unit 207 has been completed. In the registration calculation, the registration calculation unit 207 calculates the registration information described above and transmits the registration information to the CPU 203. In a case in which the registration information is not transmitted to the CPU 203 (NO in S910), the CPU 203 waits until the registration information is transmitted to the CPU 203. In a case in which the registration information is transmitted to the CPU 203 and it is determined that the registration calculation is completed (YES in S910), the CPU 203 advances the process to S911.

In S911, the CPU 203 starts the registration correction using the registration information. The CPU 203 transmits the registration information as an image correction value to the registration correction unit 208. The registration correction unit 208 starts reading the image data while executing the registration correction on the image data stored in the image memory 205.

In S912, the CPU 203 determines whether or not reading of the image data stored in the image memory 205 is completed. In a case in which it is determined that the reading of the image data stored in the image memory 205 is completed (YES in S912), the CPU 203 terminates the image reading operation.

According to the first embodiment, by scanning the original placed on the original platen glass 114 once while the reading unit 109 is moved in the sub-scanning direction SS, both detection of the inclination angle (angle θ1) of the original relative to the main scanning direction and reading of an image of the original can be performed. That is, it is possible to detect the inclination angle (angle θ1) of the original with respect to the main scanning direction and to read the image of the original without performing pre-scan. That is, the image of the original placed on the original platen glass 114 can be read in a shorter time. The image memory 205 according to the embodiment has a capacity capable of storing image data corresponding to an image having the largest size among the sizes of images that can be read at one time by the reading unit 109 being moved in the sub-scanning direction SS.

Further, according to the first embodiment, by scanning the original placed on the original platen glass 114 once while the reading unit 109 is moved in the sub-scanning direction SS, the original trailing edge end point of the original placed on the original platen glass 114 can be detected. When the original trailing edge end point is detected, the image reading operation by the reading unit 109 is terminated. As a result, since the image downstream from the original trailing edge end point in the sub-scanning direction SS is not read, the time required for the image reading operation can be reduced. That is, the image of the original placed on the original platen glass 114 can be read in a shorter time. According to the first embodiment, since it is possible to read a necessary image area without performing the pre-scan, it is possible to provide an image reading apparatus with low power consumption, high productivity and good usability.

In the first embodiment, the registration correction is performed after the reading operation by the reading unit 109 is completed. But the first embodiment is not limited to this. For example, the registration correction may be performed based on the obtained image data during the reading operation by the reading unit 109. That is, the reading operation by the reading unit 109 and the registration correction may be performed in parallel.

The size of the original may be determined based on the image data stored in the image memory 205, or the size of the original may be determined based on the image data that has undergone the registration correction. The determined size is used for determining the size of the recording medium used for a copying operation during the copying operation by an image forming apparatus to which the image reading apparatus 100 is attached.

Figure 15:
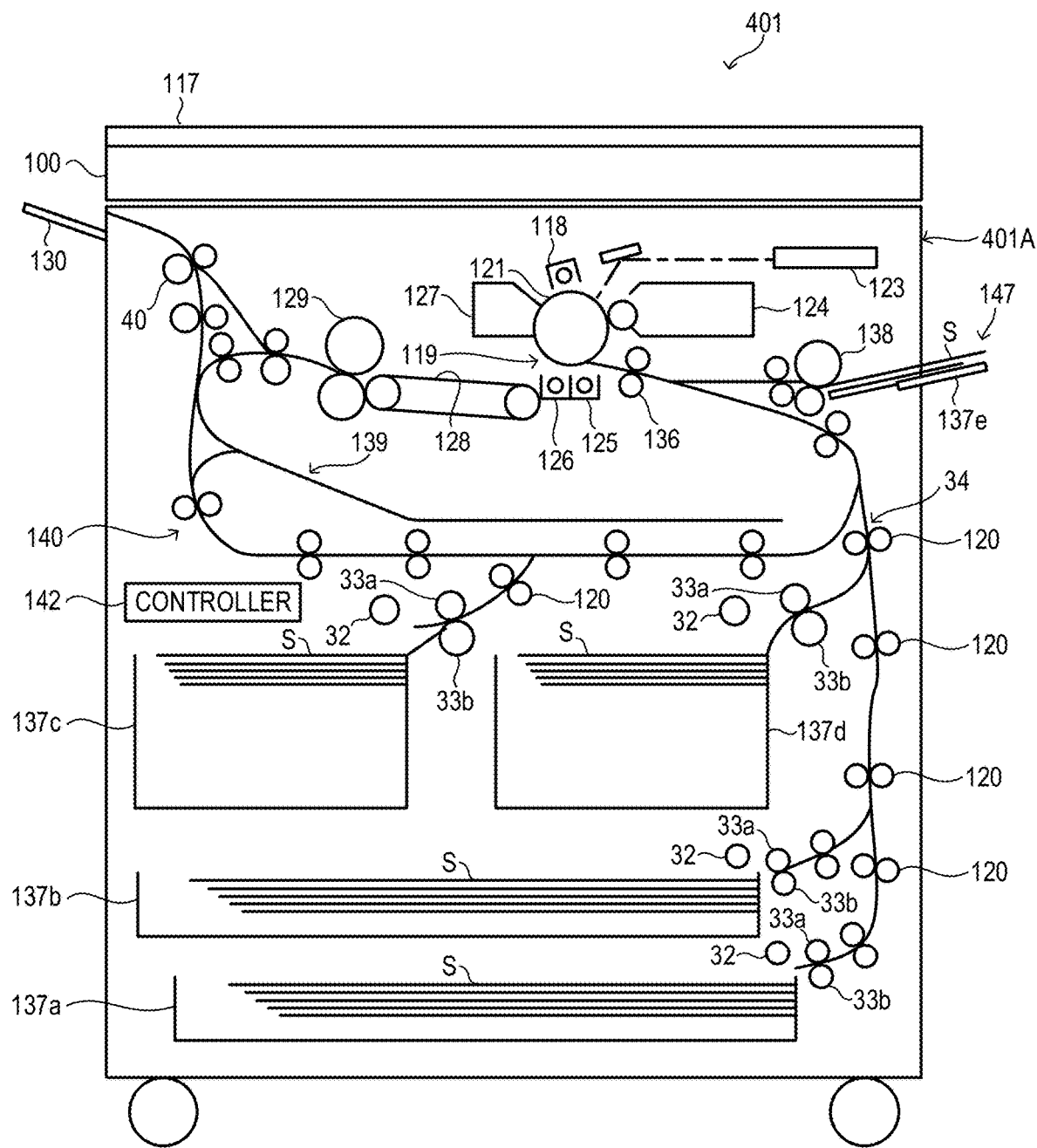
FIG. 15 is a cross-sectional view of an image forming apparatus provided with an image reading apparatus.

FIG. 15 is a cross-sectional view of an image forming apparatus 401 provided with the image reading apparatus 100. The image reading apparatus 100 is disposed above a main body 401A of the image forming apparatus 401. The image information converted into an electric signal by the image reading apparatus 100 is transferred to a controller 142 provided in the main body 401A. The main body 401A has an image forming portion 119 configured to form an image on a sheet S being a recording medium, a sheet feeding portion 34 configured to feed the sheet S to the image forming portion 119, and a manual feed portion 147. The sheet feeding portion 34 includes sheet containing portions 137a, 137b, 137c, and 137d configured to store sheets S of mutually different sizes. The sheets S contained in the sheet containing portions 137a, 137b, 137c, and 137d are fed out by a pickup roller 32, separated one by one by a feed roller 33a and a retard roller 33b, and delivered to a corresponding pair of conveyance rollers 120. The sheet S is sequentially delivered to a plurality of pairs of conveyance rollers 120 arranged along a sheet conveyance path and conveyed to a pair of registration rollers 136.

The sheet S placed on a manual feed tray 137e of the manual feed portion 147 by the user is fed to the inside of the main body 401A by a feed roller 138 and conveyed to the pair of registration rollers 136. The pair of registration rollers 136 stops a leading end of the sheet S to correct the skew, and restarts the conveyance of the sheet S in accordance with the progress of the image forming operation, which is the toner image forming process by the image forming portion 119.

The image forming portion 119 includes a photosensitive drum 121 serving as a photosensitive member, and forms an image on the sheet S by an electrophotographic method. The photosensitive drum 121 is rotatable along the conveying direction of the sheet S. A charger 118, an exposure device 123, a developing device 124, a transfer charger 125, a separation charger 126, and a cleaner 127 are arranged around the photosensitive drum 121. The charger 118 uniformly charges the surface of the photosensitive drum 121. The exposure device 123 exposes the uniformly charged surface of the photosensitive drum 121 based on image information input from the image reading apparatus 100 to form an electrostatic latent image on the surface of the photosensitive drum 121.

The developing device 124 contains a two-component developer including toner and carrier. The developing device 124 supplies charged toner to the surface of the photosensitive drum 121 and develops the electrostatic latent image with the toner to form a toner image. The toner image carried on the surface of the photosensitive drum 121 is transferred to the sheet S conveyed from the pair of registration rollers 136 by the bias electric field formed by the transfer charger 125. The sheet S on which the toner image has been transferred is separated from the photosensitive drum 121 by the bias electric field formed by the separation charger 126, and is conveyed to the fixing unit 129 by a pre-fixing conveying unit 128. The residual toner remaining on the surface of the photosensitive drum 121 without being transferred to the sheet S are removed by the cleaner 127, and the photosensitive drum 121 prepares for the next image forming operation.

The sheet S conveyed to the fixing unit 129 is nipped by a pair of rollers and heated while being pressurized, and the melted toner is fixed to the sheet S to form an image on the sheet S. The sheet S on which the image is formed is discharged by a pair of discharge rollers 40 to a discharge tray 130 projecting outward from the main body 401A. In the case of duplex printing, in order to form an image on the back side of the sheet S, the sheet S having passed through the fixing unit 129 is reversed on the front side and the back side by the reversing unit 139, and is conveyed to the pair of registration rollers 136 by a duplex conveying unit 140. The sheet S that the image is formed on the back side by the image forming portion 119 is discharged to the discharge tray 130. In this manner, the image forming apparatus 401 performs a copying operation for forming an image of the original read by the image reading apparatus 100 on the sheet S.

In the first embodiment, the original edge is extracted using G (green) digital image data. However, the present invention is not limited to the G (green) digital image data, and the original edge may be extracted using the R (red) or B (blue) digital image data. The edge extraction method by the edge extractor 206 and the registration correction method by the registration correction unit 208 are not limited to the above-described methods, but may be other methods. According to the first embodiment, the image of the original placed on the original platen glass 114 can be read in a shorter time.

Second Embodiment

The second embodiment will be described below. In the second embodiment, an example of an embodiment for further improving the extraction accuracy of the original trailing edge will be described in comparison with the first embodiment. In the first embodiment, the original trailing edge end point is extracted based on the continuity of the original edge. In the second embodiment, with respect to a pixel from which the original edge is extracted by the edge extraction method, whether or not the extracted original edge is the original trailing edge is determined based on a difference between a variance value of an original background brightness value and a variance value of a brightness value of the original pressure plate 116. In the second embodiment, the same structures as in the first embodiment are denoted by the same reference numerals and their descriptions are omitted. Since the image reading apparatus 100 of the second embodiment has the same structure as that of the first embodiment, the description thereof will be omitted. The difference from the first embodiment will be mainly described below.

(Control System)

Figure 10:
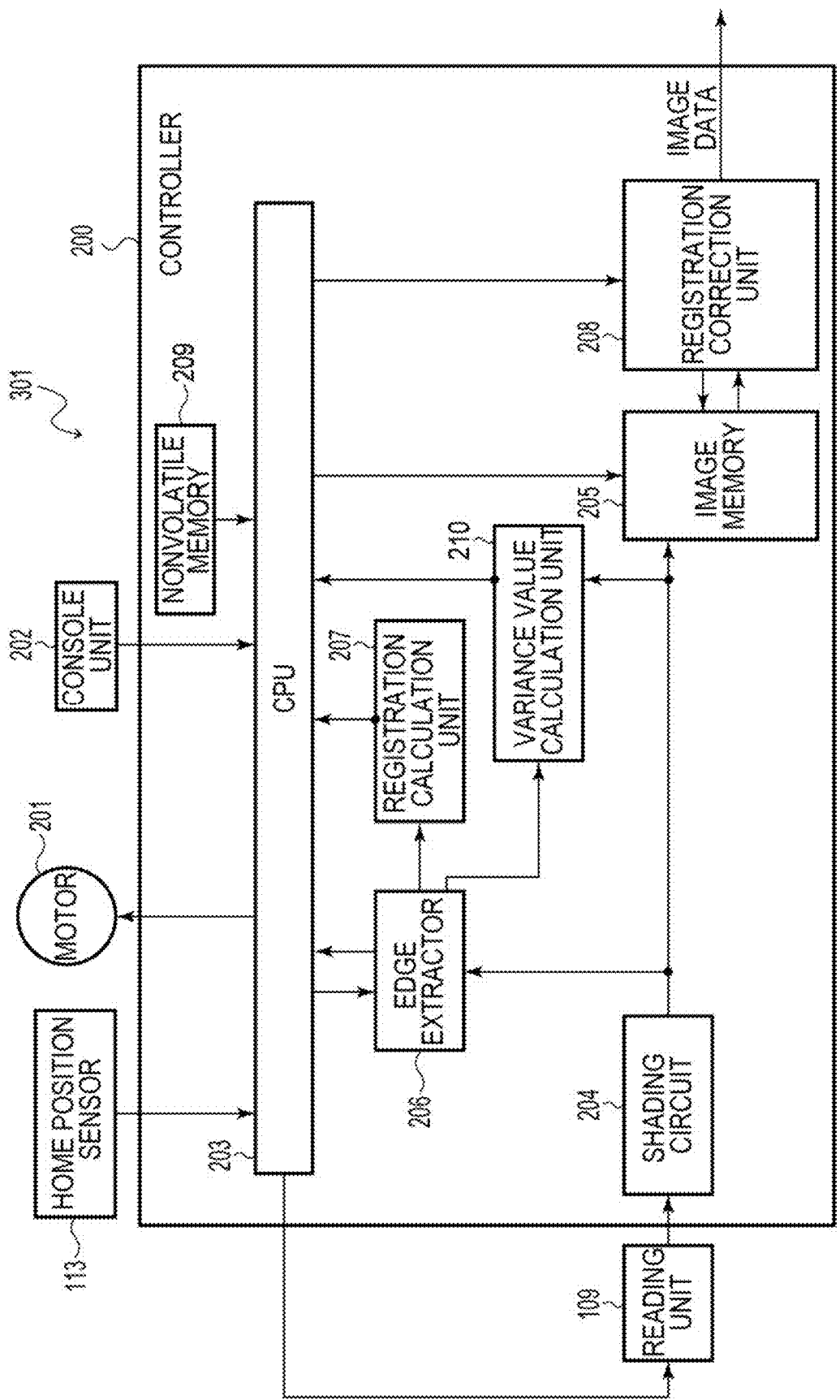
FIG. 10 is a block diagram of a control system of a second embodiment.

With reference to FIG. 10, a control system 301 of the image reading apparatus 100 of the second embodiment will be described. FIG. 10 is a block diagram of the control system 301 of the second embodiment. In the control system 301 of the second embodiment, the same structures as that of the control system 300 of the first embodiment are denoted by the same reference numerals and their descriptions are omitted. The control system 301 of the second embodiment further includes a nonvolatile memory 209 and a variance value calculation unit 210 as compared with the control system 300 of the first embodiment. The nonvolatile memory (memory portion) 209 stores a second threshold value Vth for determining a difference between the variance value of the original background brightness value and the variance value of the brightness value of the original pressure plate 116. The variance value calculation unit 210 has a function of calculating a variance value of brightness values for a plurality of lines after a predetermined number of lines with respect to the pixel of interest (light receiving element of interest) O.

(Extraction of Original Trailing Edge)

Figure 11A:
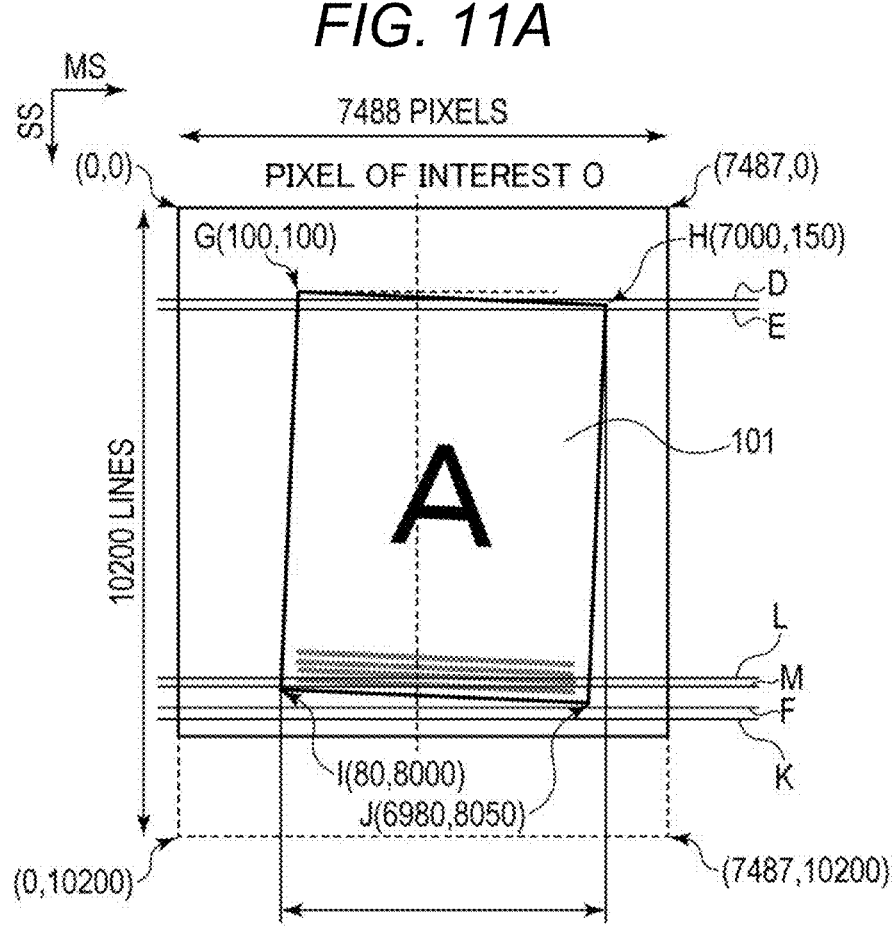
FIG. 11A and FIG. 11B are views showing a relationship between an original placed on an original platen glass and reading positions.
Figure 11B:
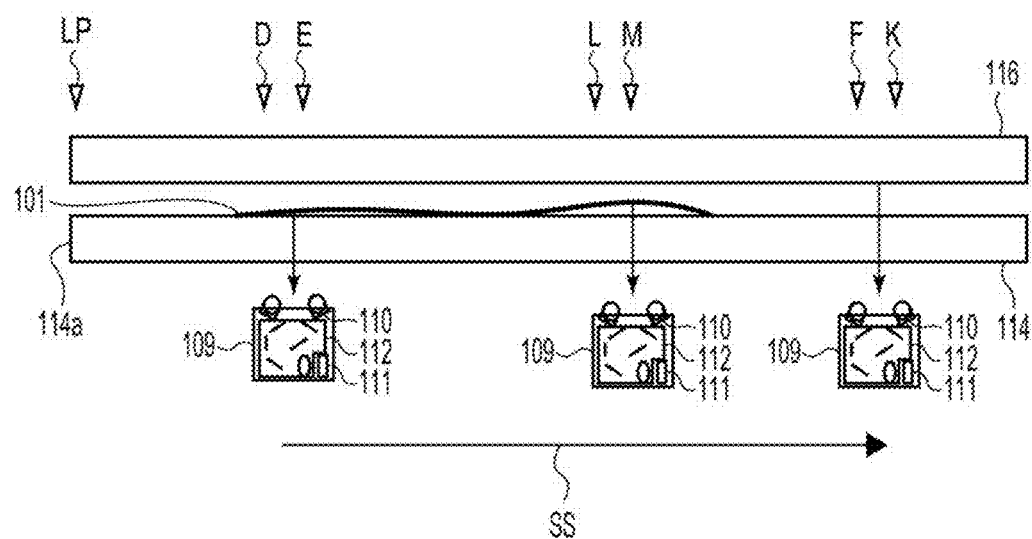

Referring to FIG. 11A, FIG. 11B, FIG. 12A, FIG. 12B, FIG. 13A and FIG. 13B, a method of extracting the original trailing edge in the second embodiment will be described. FIGS. 11A and 11B are views showing a relationship between an original 101 placed on the original platen glass 114 and reading positions D, E, L, M, F and K. FIG. 11A shows the pixel of interest O and the reading positions D, E, L, M, F, and K in the sub-scanning direction SS. A range between the reading positions D to E shows an example of a reading area in the sub-scanning direction SS in which the pixel of interest O of the reading unit 109 moving in the sub-scanning direction SS reads an area in which there is no content of the original 101. A range between the reading positions L to M shows an example of a reading area in the sub-scanning direction SS in which the pixel of interest O of the reading unit 109 moving in the sub-scanning direction SS reads an area in which the contents of the original 101 are present. A range between the reading positions F to K shows an example of a reading area in the sub-scanning direction SS in which the pixel of interest O of the reading unit 109 moving in the sub-scanning direction SS reads the original pressure plate 116 as a background without the original 101.

FIG. 11B is a cross-sectional view of the reading unit 109 between the reading positions D-E, L-M and F-K in the sub-scanning direction SS. Since the original 101 is paper, the original 101 has some unevenness. The original pressure plate 116 has a high surface property and is substantially flat without unevenness. The reading unit 109 between the reading positions D to E and between the reading positions L to M reads the original 101. The reading unit 109 between the reading positions F to K reads the original pressure plate 116.

(Calculation of Variance Value)

Figure 12A:
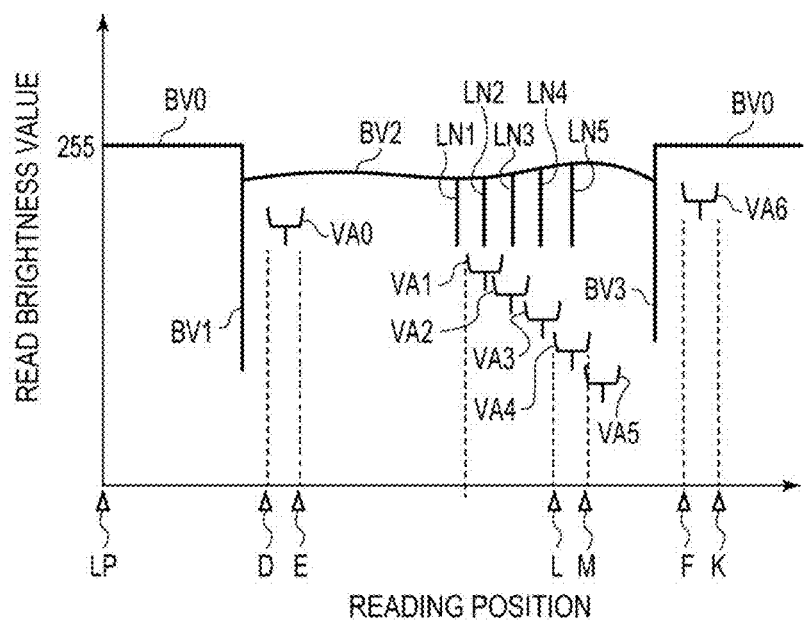
FIG. 12A and FIG. 12B are explanatory views of calculation areas of variance values calculated by a variance value calculation unit.
Figure 12B:
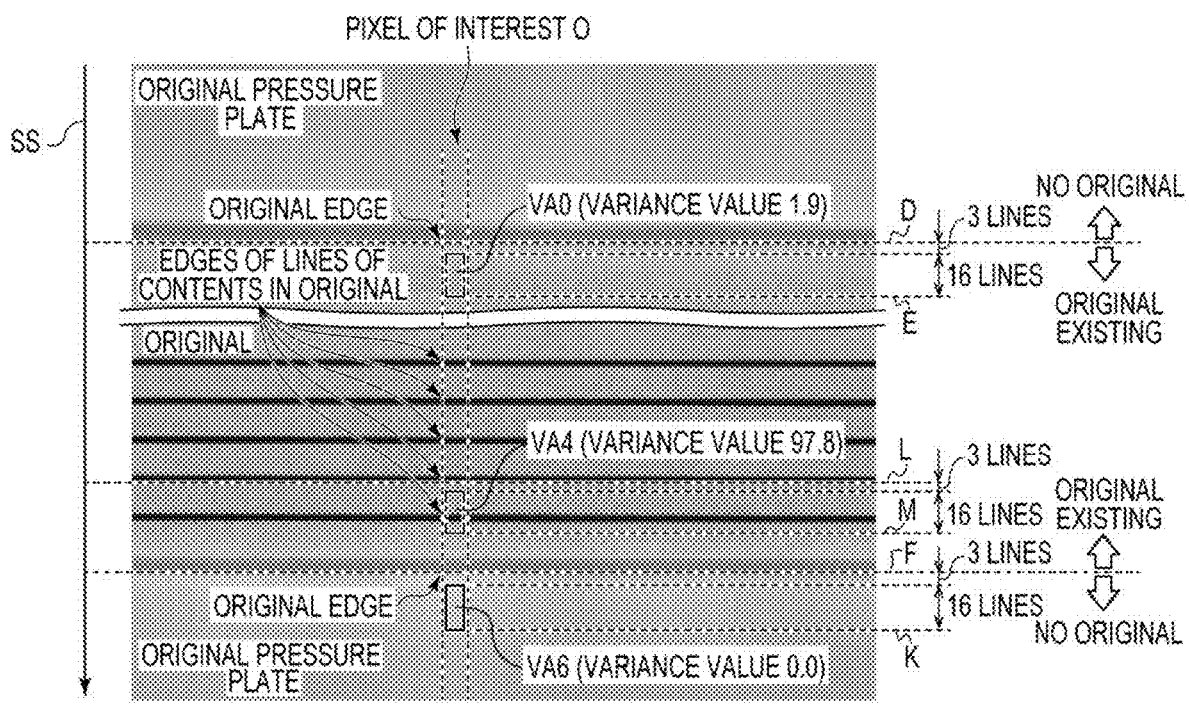

FIGS. 12A and 12B are explanatory views of the calculation areas of the variance values calculated by the variance value calculation unit 210. FIG. 12A is an explanatory view showing the calculation areas of the variance values in a graph showing a relationship between the read positions and read brightness values. The horizontal axis represents the reading position in the sub-scanning direction SS. The vertical axis represents the read brightness value. FIG. 12A shows the read brightness values read by the pixel of interest O of the reading unit 109 moving in the sub-scanning direction SS. Specifically, the read brightness value BV0 of the original pressure plate 116, the read brightness value BV1 of the original leading edge, and the read brightness value BV2 of the white background portion of the original 101 read by the pixel of interest O are shown. Furthermore, the read brightness values LN1, LN2, LN3, LN4 and LN5 of the lines of the contents of the original 101 read by the pixel of interest O and the read brightness value BV3 of the original trailing edge read by the pixel of interest O are shown.

The reading unit 109 starts reading from a position LP of the one end 114a of the original platen glass 114. Since there is no original 101 from the position LP of one end 114a of the original platen glass 114 to the original leading edge, the reading unit 109 reads the original pressure plate 116 and outputs the read brightness value BV0 of the original pressure plate 116. Since the original pressure plate 116 is a white flat member, the read brightness value BV0 of the original pressure plate 116 hardly varies. Thereafter, the reading unit 109 reads the original leading edge and outputs the read brightness value BV1 of the original leading edge. The read brightness value BV1 of the original leading edge is lower than the read brightness value BV0 of the original pressure plate 116.

Thereafter, the reading unit 109 reads the white background portion of the original 101 and outputs the read brightness value BV2 of the white background portion of the original 101. Even if the white background portion of the original 101 has the same density, the read brightness value BV2 of the white background portion of the original 101 varies slightly due to the unevenness of the original 101. Thereafter, the reading unit 109 reads the lines of the contents of the original 101 and outputs the read brightness values LN1, LN2, LN3, LN4 and LN5 of the lines. The read brightness values LN1 to LN5 of the lines are lower than the read brightness value BV2 of the white background portion according to the densities of the lines. Thereafter, the reading unit 109 reads the original trailing edge and outputs the read brightness value BV3 of the original trailing edge. The read brightness value BV3 of the original trailing edge is lower than the read brightness value BV2 of the white background portion of the original 101. Thereafter, the reading unit 109 moves outside the range of the original 101, reads the original pressure plate 116 again, and outputs the read brightness value BV0 of the original pressure plate 116.

Taking the extraction of the original edge by the edge extraction method as a trigger, the variance values of the read brightness values are obtained in order to determine whether the original edge is the original trailing edge. The following variance value calculation is performed for all pixels determined to be original edges by the edge extraction described with reference to FIGS. 4A to 4D. In a case in which the read brightness value BV2 of the original leading edge is detected as the original edge, the variance value is obtained from the read brightness value of the variance value calculation area VA0 by extracting the original leading edge. FIG. 12B is a view showing variance value calculation areas VA0, VA4, and VA6 for which the variance values are calculated by the variance value calculation unit 210.

The variance value calculation area VA0 is an area between the reading position D of the start line after the first predetermined number of lines from the line of the read brightness value BV1 detected as an original edge and the reading position E of the end line from the reading position D to the second predetermined number of lines. In the variance value calculation area VA0 surrounded by the square of the dotted line in FIG. 12B, the white background portion of the original 101 is read by the pixel of interest O with the extraction of the original leading edge as a trigger. The first predetermined number of lines is the number of lines from the line extracted as the original edge to the start line for starting the calculation of the variance value. The second predetermined number of lines is the total number of lines for calculating the variance value from the start line to the end line. The first predetermined number of lines and the second predetermined number of lines are fixed values determined in advance based on the experimental data. The first predetermined number of lines is set at 3 in the embodiment because a predetermined number of lines is spaced in order to eliminate the influence of pixels which do not barely catch on the first threshold value pth of edge extraction. The second predetermined number of lines is set at 16 in the embodiment based on the experimental data.

In a case in which the read brightness values LN1, LN2, LN3, LN4, and LN5 of the lines of the contents in the original 101 are detected as original edges, variance values are obtained from the read brightness values of the variance value calculation areas VA1, VA2, VA3, VA4, and VA5 with the extraction of the lines as a trigger. The variance value calculation areas VA1 to VA5 are areas between the start lines after the first predetermined number of lines from the respective lines of the read brightness values LN1 to LN5 of the lines of the contents and the end lines from the start lines to the second predetermined number of lines, respectively. For example, as a trigger by extracting the read brightness value LN4 of the fourth line of the contents in the original 101 as the original edge, the variance value is obtained from the read brightness value of the variance value calculation area VA4. The variance value calculation area VA4 is an area between the reading position L of the start line after the first predetermined number of lines from the line of the read brightness value LN4 detected as an original edge and the reading position M of the end line from the reading position L to the second predetermined number of lines. In the variance value calculation area VA4 surrounded by the square of the dotted line in FIG. 12B, the white background portion of the original 101 and the line of the contents are read by the pixel of interest O with the extraction of the line of the contents as a trigger.

The variance value calculation area VA6 is an area between the reading position F of the start line after the first predetermined number of lines from the line of the read brightness value BV3 detected as an original edge and the reading position K of the end line from the reading position F to the second predetermined number of lines. In the variance value calculation area VA6 surrounded by a solid square in FIG. 12B, the original pressure plate 116 is read by the pixel of interest O with the extraction of the original trailing edge as a trigger.

Figures 13A, 13B:
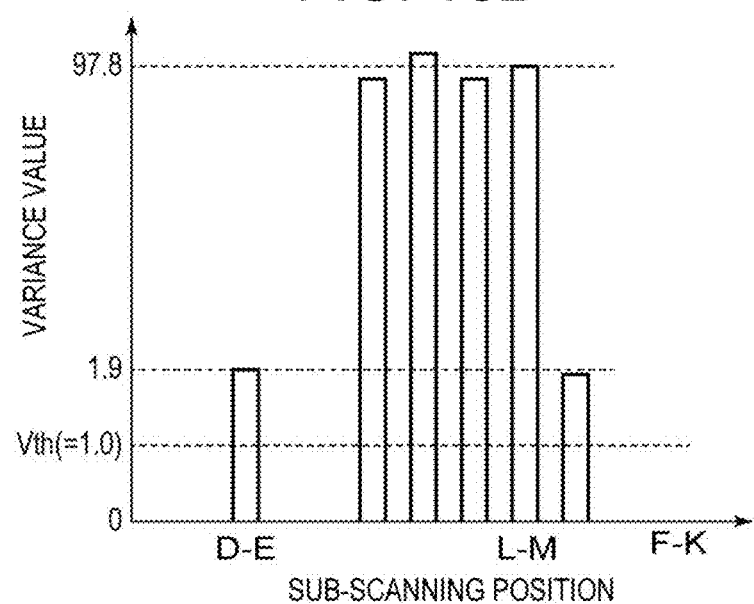
FIG. 13A and FIG. 13B are explanatory views of variance value calculation.

FIG. 13A and FIG. 13B are explanatory views of the variance value calculation. FIG. 13A is a view showing brightness values and variance values for each line of the variance value calculation areas VA0, VA4, and VA6. The variance value is calculated from the brightness value of each line in the variance value calculation area by the following expression 2.

$$\text{Variance Value} = \frac{1}{P}\sum_{i=1}^{P}(Xi - Xave)^2 \qquad \text{Expression 2}$$

Here, P is a number of data for calculating the variance value, that is, 16 of the second predetermined number of lines in the embodiment. Xi is a brightness value of the i-th line. Xave is an average value of brightness values in the variance value calculation area.

In the variance value calculation area VA0 between the reading positions D and E, after the original leading edge is extracted, the variance value of the white background portion of the original 101 is calculated. As described with reference to FIG. 12A, since the read brightness value of the white background portion of the original 101 is affected by the unevenness of the original 101, the read brightness value varies between 249 to 255 as shown in FIG. 13A. According to the expression 2 described above, the variance value is 1.9.

In the variance value calculation area VA4 between the reading positions L and M, after the edge of the line of the contents in the original is extracted, the variance values of the white background portion of the original 101 and the line of the contents are calculated. As shown in FIG. 13A, the read brightness values of the eighth line, the ninth line, and the tenth line are the brightness values of the lines of the contents, and therefore have a low value of 10. According to the expression 2 described above, the variance value is 97.8.

In the variance value calculation area VA6 between the reading positions F and K, after the original trailing edge is extracted, the variance value of the white background portion of the original pressure plate 116 is calculated. As described with reference to FIG. 12A, since the original pressure plate 116 is the white flat member, the read brightness value of the original pressure plate 116 becomes constant at 255. According to the expression 2 described above, the variance value is 0.0.

FIG. 13B is an explanatory view of the second threshold value Vth for determining whether or not the extracted original edge is an original trailing edge. As described with reference to FIG. 13A, in the case in which the original leading edge is extracted as the original edge and the white background portion of the original 101 is read, the variance value is 1.9. In the case in which the line of the contents in the original 101 is extracted as an original edge and the white background portion of the original 101 and the lines of the contents are read, the variance value is 97.8. In the case in which the original trailing edge is extracted as the original edge and the original pressure plate 116 is read, the variance value is 0.0.

In a case in which the 1st to 3rd lines of the contents in the original 101 are extracted as the original edges, since the following lines are included in the variance value calculation areas VA1, VA2 and VA3 in the same manner as the case in which the 4th line is extracted as the original edge, the variance value becomes a value close to 97.8. On the other hand, in a case in which the fifth line of the contents in the original 101 is extracted as the original edge, since the variance value of the white background portion of the original 101 is calculated in the same manner as the case in which the original leading edge is extracted as the original edge, the variance value becomes a value close to 1.9. As described above, the second threshold value Vth for determining whether or not the extracted original edge is the original trailing edge is set to "1.0". In a case in which the variance value is equal to or greater than the second threshold value Vth, since the reading unit 109 is reading the white background portion of the original 101, it is determined that the extracted original edge is not the original trailing edge. In a case in which the variance value is smaller than the second threshold value Vth, it is determined that the extracted original edge is an original trailing edge because the reading unit 109 is reading the original pressure plate 116 past the original 101.

Here, for the purpose of explanation, three patterns of the variance value calculation area VA0 between the reading positions D and E, the variance value calculation area VA4 between the reading positions L and M, and the variance value calculation area VA6 between the reading positions F and K are shown as examples of the variance value calculation area. However, in the embodiment, in accordance with the movement of the reading unit 109 in the sub-scanning direction SS, for a pixel extracted as an original edge, the variance value is calculated in the variance value calculation area. For a pixel that is not extracted as an original edge, the variance value is not calculated because there is no possibility that the pixel is an original trailing edge. Therefore, the view showing the relationship between the sub-scanning position and the variance value shown in FIG. 13B is a discrete graph.

The second threshold value Vth is preset based on the experimental data and stored in the nonvolatile memory 209. An original trailing edge flag Vs (n) (n: pixel number) is put up for a pixel from which an original trailing edge has been extracted using the second threshold value Vth. In a case in which it is determined that the extracted original edge is the original trailing edge, the original trailing edge flag Vs (n) is set to "1". In a case in which it is determined that the extracted original edge is not the original trailing edge, the original trailing edge flag Vs (n) is set to "0". As for the pixel on which the original trailing edge flag Vs (n) is put up, "1" of the original trailing edge flag Vs (n) continues to be held.

(Determination of Original Trailing Edge End Point)

The CPU 203 determines that the maximum pixel number (maximum light receiving element position) Psmax in the main scanning direction MS of the original 101 is 7000 because the direction of continuity of the edge pixels extracted as the original edge changes at the vertex H (7000,150) in FIG. 11A. The CPU 203 determines that the minimum pixel number (minimum light receiving element position) Psmin in the main scanning direction MS of the original 101 is 80 because the direction of continuity of edge pixels extracted as original edges changes at the vertex I (80, 8000) in FIG. 11A. The CPU 203 stores the minimum pixel number Psmin of 80 (Psmin=80) and the maximum pixel number Psmax of 7000 (Psmax=7000) in an internal memory (not shown).

After the minimum pixel number Psmin and the maximum pixel number Psmax are determined, the CPU 203 determines whether or not the original trailing edge flags Vs (n) of all pixels between the pixel of the minimum pixel number Psmin and the pixel of the maximum pixel number Psmax are put up. In a case in which the original trailing edge flags Vs (n) of all pixels between the pixel of the minimum pixel number Psmin and the pixel of the maximum pixel number Psmax is put up, the CPU 203 determines that the original trailing edge end point has been extracted. In FIG. 11A, at the pixel of the vertex J (6980, 8050), the original trailing edge flags Vs (n) are put up for all pixels between the pixel of the minimum pixel number Psmin and the pixel of the maximum pixel number Psmax. The CPU 203 determines that the pixel at the vertex J (6980, 8050) is an original trailing edge end point. The CPU 203 ends the movement of the reading unit 109 in the sub-scanning direction SS.

(Control Flowchart)

Figure 14:
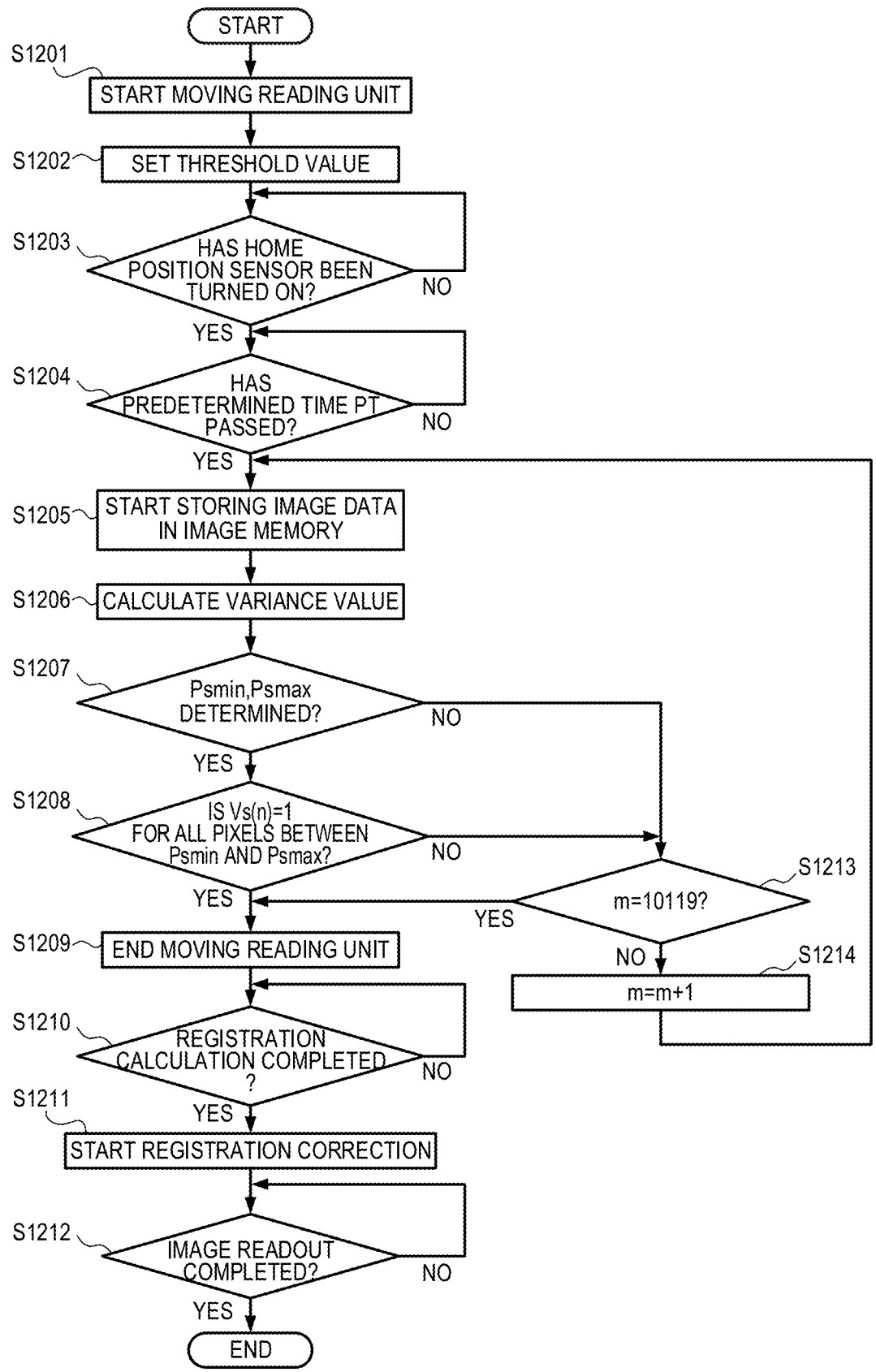
FIG. 14 is a flowchart showing an image reading operation of the second embodiment.

FIG. 14 is a flowchart showing an image reading operation of the second embodiment. The CPU 203 executes the image reading operation in accordance with a program stored in the internal memory (not shown). When receiving the instruction to start reading from the console unit 202, the CPU 203 moves the reading unit 109 from the waiting position toward the original platen glass 114 in the sub-scanning direction SS in S1201.

In S1202, the CPU 203 reads out the second threshold value Vth stored in the nonvolatile memory 209 and sets the second threshold value Vth to the variance value calculation unit 210. In S1203, the CPU 203 determines whether or not the home position sensor 113 is turned on. In a case in which the home position sensor 113 is not turned on (NO in S1203), the CPU 203 waits until the reading unit 109 reaches the home position sensor 113. In a case in which the reading unit 109 reaches the home position sensor 113, the home position sensor 113 is turned on. In a case in which the home position sensor 113 is turned on (YES in S1203), the CPU 203 advances the process to S1204.

In S1204, the CPU 203 determines whether or not a predetermined time PT has elapsed from the time t1 (FIG. 3) at which the home position sensor 113 is turned on. In a case in which the predetermined time PT elapses, the predetermined timing t2 shown in FIG. 3 is reached. In a case in which the predetermined time PT has not elapsed (NO in S1204), the CPU 203 waits until the predetermined time PT has elapsed and the predetermined timing t2 is reached. In the case in which the predetermined time PT has elapsed (YES in S1204), the CPU 203 advances the process to S1205.

In S1205, the CPU 203 starts to store the image data output from the reading unit 109 into the image memory 205 via the shading circuit 204. At this time, the image data is simultaneously transmitted to the edge extractor 206 and the variance value calculation unit 210 via the shading circuit 204. The edge extractor 206 starts the edge extraction processing, and transmits binarized data obtained by the edge extraction processing to the registration calculation unit 207 and the variance value calculation unit 210. The registration calculation unit 207 starts the registration calculation.

In 51206, the variance value calculation unit 210 performs the variance value calculation for all the pixels subjected to the edge extraction processing in S1205. In a case in which the original trailing edge flag Vs (n) is "1" (Vs (n)=1), the variance value calculation unit 210 holds that the original trailing edge flag Vs (n) is "1" (Vs (n)=1) as a pixel on which the original trailing edge flag Vs (n) is put up.

In S1207, the CPU 203 determines whether or not the minimum pixel number Psmin and the maximum pixel number Psmax of the pixels on which the original trailing edge flag Vs (n) has been put up due to the direction of continuity of the original edges being changed. In a case in which both the minimum pixel number Psmin and the maximum pixel number Psmax are determined (YES in S1207), the CPU 203 advances the process to S1208. In a case in which at least one of the minimum pixel number Psmin and the maximum pixel number Psmax has not been determined (NO in S1207), the CPU 203 advances the process to S1213.

In S1208, the CPU 203 determines whether or not the original trailing edge flag Vs (n) is put up (Vs (n)=1) for all pixels between the pixel of the minimum pixel number Psmin and the pixel of the maximum pixel number Psmax determined in S1207. In a case in which the original trailing edge flag Vs (n) for all pixels between the pixel of the minimum pixel number Psmin and the pixel of the maximum pixel number Psmax is "1" (YES in S1208), the CPU 203 determines that the original trailing edge end point has been extracted, and advances the proceed to S1209. Otherwise (NO in S1208), the CPU 203 advances the process to S1213.

In S1213, the CPU 203 determines whether the line number "m" in the sub-scanning direction SS has reached "10119". In a case in which the line number "m" has reached "10119" (YES in S1213), the CPU 203 advances the process to S1209. On the other hand, in a case in which the line number "m" has not reached "10119" (NO in S1213), the CPU 203 advances the process to S1214. In S1214, the CPU 203 increments the line number "m" (m=m+1). The CPU 203 returns the process to S1205.

In S1209, the CPU 203 stops the motor 201 to end the movement of the reading unit 109 in the sub-scanning direction SS. In S1210, the CPU 203 determines whether or not the registration calculation by the registration calculation unit 207 has been completed. In the registration calculation, the registration calculation unit 207 calculates an angle θ1 of the original leading edge, a direction (sign) of the angle, a coordinate (x1, y1) of a left end portion of the original leading edge, and a width W of the original leading edge in the main scanning direction MS, and transmits them to the CPU 203. In a case in which the registration data has not been transmitted to the CPU 203 (NO in S1210), the CPU 203 waits until the registration data is transmitted to the CPU 203. In a case in which the registration data is transmitted to the CPU 203 and it is determined that the registration calculation is completed (YES in S1210), the CPU 203 advances the process to S1211.

In S1211, the CPU 203 starts registration correction. The CPU 203 transmits registration data as an image correction value to the registration correction unit 208. The registration correction unit 208 starts reading the image data while performing the registration correction to the image data stored in the image memory 205.

In S1212, the CPU 203 determines whether or not reading of the image data stored in the image memory 205 is completed. In a case in which it is determined that the reading of the image data stored in the image memory 205 is completed (YES in S1212), the CPU 203 terminates the image reading operation.

According to the second embodiment, the image reading operation by the reading unit 109 can extract the original trailing edge end point of the original placed roughly on the original platen glass 114 without performing the pre-scan, and the image reading operation can be terminated. Thus, the time required for the image reading operation can be shortened by reading the necessary image area only by the image reading operation. According to the second embodiment, since a necessary image area can be read without performing the pre-scan, an image reading apparatus having low power consumption and high productivity and good usability can be provided. According to the second embodiment, the image of the original placed on the original platen glass 114 can be read in a shorter time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-134766, filed Aug. 7, 2020, which is hereby incorporated by reference herein in its entirety.

What is claimed is:

1. An image reading apparatus comprising:
an original platen on which an original is placed;
an original pressure plate configured to press the original placed on the original platen;
a reading unit having a plurality of light receiving elements arranged in a main scanning direction and configured to read the original placed on the original platen;
a moving portion configured to move the reading unit in a sub-scanning direction orthogonal to the main scanning direction;
an edge extractor configured to extract original edges from image data of the original pressure plate and the original read by the reading unit being moved in the sub-scanning direction by the moving portion;
a storage portion configured to store the image data read by the reading unit;
a determiner configured to determine, from the original edges extracted by the edge extractor, an angle of an original leading edge on an upstream side in the sub-scanning direction with respect to the main scanning direction and position information of one end of the original leading edge;
a controller configured to terminate a movement of the reading unit in a case in which an original trailing edge end point on a downstream side in the sub-scanning direction is extracted from the original edges extracted by the edge extractor; and
a rotation correction unit configured to correct a rotation of the image data stored in the storage portion based on the angle and the position information determined by the determiner, and reads out corrected image data from the storage portion.

2. The image reading apparatus according to claim 1, wherein the edge extractor binarizes the image data to generate binarized data, and extracts the original edges based on the binarized data.

3. The image reading apparatus according to claim 2, wherein the edge extractor uses a first threshold value to generate the binarized data from the image data.

4. The image reading apparatus according to claim 1, wherein the controller determines whether or not the original edges are continuous based on an extraction result of the edge extractor after the original leading edge is extracted, and determines that the original trailing edge end point is extracted in a case in which the original edges are not continuous.

5. The image reading apparatus according to claim 1, further comprising:
a variance value calculation unit configured to calculate a variance value of read brightness values for a plurality of lines outputted from a light receiving element of interest among the plurality of light receiving elements; and
a memory portion configured to store a second threshold value,
wherein the variance value calculation unit calculates the variance value of the read brightness value outputted from the light receiving element of interest between a start line after a first predetermined number of lines from a line from which an original edge is extracted by the edge extractor and an end line from the start line to a second predetermined number of lines, and
wherein the controller determines whether or not an original edge is the original trailing edge based on the variance value and the second threshold value.

6. The image reading apparatus according to claim 5, wherein in a case in which the original trailing edge is extracted for all the light receiving elements between a maximum light receiving element position and a minimum light receiving element position from which the original edges are extracted, the controller ends the movement of the reading unit.

* * * * *